(12) United States Patent
Aoshima et al.

(10) Patent No.: US 7,212,943 B2
(45) Date of Patent: May 1, 2007

(54) BODY MOTION DETECTION DEVICE, PITCH METER, WRISTWATCH-TYPE INFORMATION PROCESSING DEVICE, METHOD FOR CONTROLLING THEREOF, CONTROL PROGRAM, AND STORAGE MEDIUM

(75) Inventors: Ichiro Aoshima, Hotaka-machi (JP); Yutaka Kawafune, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 10/791,282

(22) Filed: Mar. 3, 2004

(65) Prior Publication Data

US 2004/0186695 A1      Sep. 23, 2004

(30) Foreign Application Priority Data

Mar. 7, 2003    (JP)    ............................. 2003-061781
Oct. 17, 2003   (JP)    ............................. 2003-357980

(51) Int. Cl.
G06F 15/00    (2006.01)

(52) U.S. Cl. ..................................... 702/141
(58) Field of Classification Search ............... 702/141; 235/105; 33/512; 340/573.1
See application file for complete search history.

(56) References Cited

U.S. PATENT DOCUMENTS 5,908,396 A       6/1999   Hayakawa et al.
6,418,181 B1 *    7/2002   Nissila ......................... 377/23
6,571,193 B1 *    5/2003   Unuma et al. ............... 702/141
6,834,436 B2 *   12/2004   Townsend et al. ............ 33/512
2002/0089425 A1 * 7/2002   Kubo et al. ............... 340/573.1
2004/0094613 A1 * 5/2004   Shiratori et al. ............ 235/105

FOREIGN PATENT DOCUMENTS

| JP | 2-000612 U | 1/1990 |
| JP | 09114955 A | 5/1997 |
| JP | 200278697 A | 3/2002 |
| JP | 2002191580 A | 7/2002 |

* cited by examiner

*Primary Examiner*—John Barlow
*Assistant Examiner*—Xiuqin Sun
(74) *Attorney, Agent, or Firm*—Global IP Counselors, LLP

(57) ABSTRACT

A body motion detection device is provided that is configured to be attached to a forearm of a user to detect a body motion of the human body to detect body motions of the user. The body motion detection device basically comprises a body motion sensor unit and a body motion component extracting section. The body motion sensor unit is configured and arranged to detect an acceleration caused substantially by a movement of the forearm during walking and an acceleration caused substantially by a movement of the forearm during running to output at least one body motion signal. The body motion component extracting section is configured and arranged to extract a body motion component from said at least one body motion signal. Thus, pitch of the user can be measured based on the body motion component both when the user is running and walking.

28 Claims, 37 Drawing Sheets

$\theta 1 = 25° \pm 8°$
$\theta = 50° \pm 15°$

BODY MOTION DETECTION DEVICE, PITCH METER, WRISTWATCH-TYPE INFORMATION PROCESSING DEVICE, METHOD FOR CONTROLLING THEREOF, CONTROL PROGRAM, AND STORAGE MEDIUM

BACKGROUND OF THE INVENTION

1. Field of the Invention

The present invention relates to a body motion detection device, a pitch meter, a wristwatch-type information processing device, a method for controlling thereof, a control program, and a storage medium. The present invention particularly relates to technology for reliably determining pitch of a user from a detected body motion signal regardless of whether the user is walking or running.

2. Background Information

In a conventional pedometer for measuring the number of steps when a user is running or walking, a body motion signal is detected by an installed acceleration sensor (body motion sensor). As seen in FIG. 42, the obtained body motion signal is converted to a rectangular waveform, and the number of steps is determined from the body motion signal converted to the rectangular waveform. Specifically, when the body motion signal (analog signal) shown in the upper part of FIG. 42 is amplified and then converted to a rectangular waveform using a prescribed threshold value TH1, a pulse signal PS having the pulse shape shown in the lower part of FIG. 42 is obtained. However, since the characteristics of the waveform of the outputted signal are different between when the user walks with arms extended and when the user runs with arms bent, there are problems in that the number of steps cannot be accurately counted merely by converting the body motion signal to a rectangular waveform.

Therefore, in the pedometer shown in Japanese Laid-Open Utility Model Patent Publication No. H2-612 (Japanese Utility Model Patent Application No. S63-79116), a method is proposed wherein every time the number of pulses in a pulse signal PS is counted, a mask time of a certain interval is set whenever one pulse is counted. Accordingly, pulses are counted in units of two and the counted number is doubled to determine the number of steps. Thus, the precision of detection is improved.

However, in the above-mentioned conventional pedometer, the counted number cannot be doubled to determine the number of steps and improve the precision of detection if the mask time is not set such that the pulses are counted in a manner in which a single pulse is always counted in the mask time. Therefore, the mask time must be set depending on the walking speed or running speed (proportionate to pitch).

Specifically, when the pitch is 81 to 159 cycles/min, setting the mask time to 0.75 sec allows a single pulse to be included in the mask time, and the number of steps can accurately be determined by the method described above. However, when the pitch is 80 cycles/min or less, or 160 cycles/min or more, either no pulses are included at all in the mask time or a plurality of pulses are included, which has been the cause of errors. However, it is difficult to distinguish between a state of walking and a state of running by the pitch waveform alone, and the determinations are susceptible to error. Also, although the erroneous results can be prevented if the user chooses the operations of the pedometer between a state of walking and a state of running by manual operations every time the user uses the pedometer, problems occur in that ease of use is compromised.

Moreover, as in the above-mentioned conventional method, with a method of calculating the number of steps using rectangular waveform conversion, it has been a problem that when noise gets mixed in or when the operating direction and the direction of sensitivity of the sensor do not coincide, the body motion signal is not clearly outputted in accordance with the leg motion as shown, for example, in FIG. 43. In such cases, calculation results of the pitch contain large errors. More specifically, concerning the points originally meant to be counted (the timing shown by the arrow in FIG. 43), at point E where noise gets mixed in, the pulse is erroneously counted and the calculated pitch grows large in relation to the actual pitch. Conversely, at point NC, where the body motion signal has a low level, the pulse is not counted, and the pitch becomes small in relation to the actual pitch.

In view of the above, it will be apparent to those skilled in the art from this disclosure that there exists a need for an improved body motion detection device. This invention addresses this need in the art as well as other needs, which will become apparent to those skilled in the art from this disclosure.

SUMMARY OF THE INVENTION

One object of the present invention is to provide a body motion detection device, a pitch meter, a wristwatch-type information processing device, a method for controlling thereof, a control program, and a storage medium whereby it is possible to accurately measure the pitch without distinguishing between running and walking and to reduce labor for the user.

In order to achieve the above mentioned and other objects of the present invention, a body motion detection device is provided that is configured to be attached to a forearm of a human body to detect a body motion of the human body. The body motion detection device basically comprises a body motion sensor unit and a body motion component extracting section. The body motion sensor unit is configured and arranged to detect an acceleration caused substantially by a movement of the forearm during walking and an acceleration caused substantially by a movement of the forearm during running to output at least one body motion signal. The body motion component extracting section is configured and arranged to extract a body motion component from said at least one body motion signal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring to FIGS. 1 through 23, the body motion detection device will be described herein according to the first embodiment of the present invention. In the body motion detection device in accordance with the first embodiment of the present invention, two body motion sensors or acceleration sensors are disposed such that the first harmonic can be detected during either walking or running. A first acceleration sensor is preferably disposed so as to be able to primarily detect acceleration in a direction substantially perpendicular to the axial direction of the forearm, which is primarily originating in the arm movement during walking. A second acceleration sensor is preferably disposed so as to be able to detect acceleration in a direction substantially perpendicular to a straight line between the shoulder and wrist when the forearm is bent at a specific angle in relation to the upper arm, which is primarily originating in the arm movement during walking. In this arrangement of the two sensors, the pitch can be accurately calculated based on the detected first harmonic regardless of whether the user is walking or running.

Figure 1:
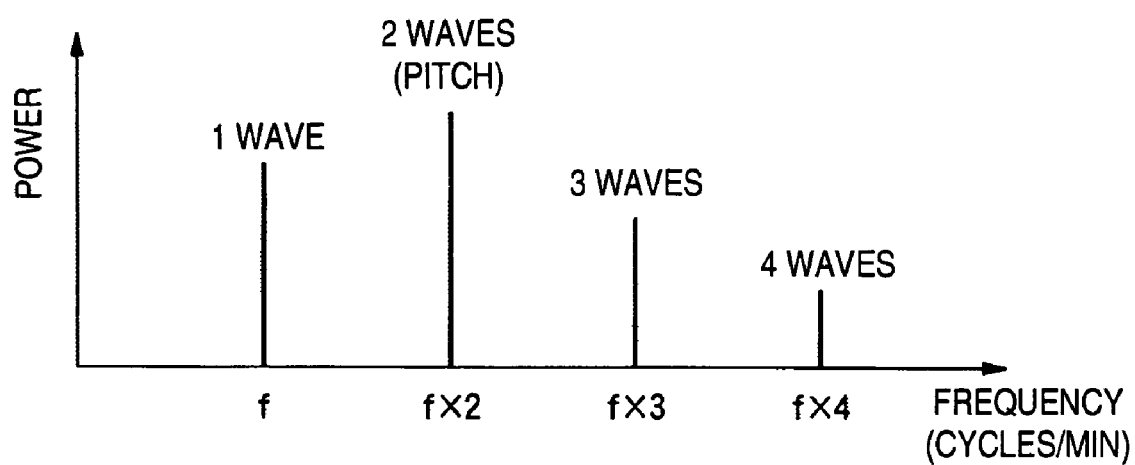
FIG. 1 is an explanatory diagram of FFT (fast Fourier transformation) analysis results for the output signals of an acceleration sensor during pitch detection.

First, the basic principle for the arrangements of the two acceleration sensors for detecting body motion components in the body motion detection device in accordance with the present invention will be described. FIG. 1 is a simplified explanatory diagram of FFT (fast Fourier transformation) analysis results for the output signals of an arbitrary acceleration sensor during pitch detection. In a case that the acceleration sensor is attached to a forearm of a user, the output signals of the acceleration sensor during walking and running have the spectrum shown in FIG. 1 when subjected to FFT analysis. As seen in FIG. 1, a high-level line spectrum is usually shown wherein the back-and-forth component of arm movement (a back-and-forth motion is counted as one cycle) is the basic wave (first harmonic, frequency f shown as 1 wave in the diagram). Twice the frequency component of the basic wave is the second harmonic (equivalent to pitch; shown as 2 waves in the diagram). Three times the frequency component of the basic wave is the third harmonic (shown as 3 waves in the diagram). Four times the frequency component of the basic wave is the fourth harmonic (shown as 4 waves in the diagram).

In view of the above, when determining pitch from the line spectra in the present embodiment, two acceleration sensors, a first acceleration sensor A and a second acceleration sensor B, corresponding to walking and running, respectively, are provided to perform calculations suitable to either case. Thus, pitch of the user can be calculated regardless of the difference between the line spectrum for walking and the spectrum for running.

Figure 2:
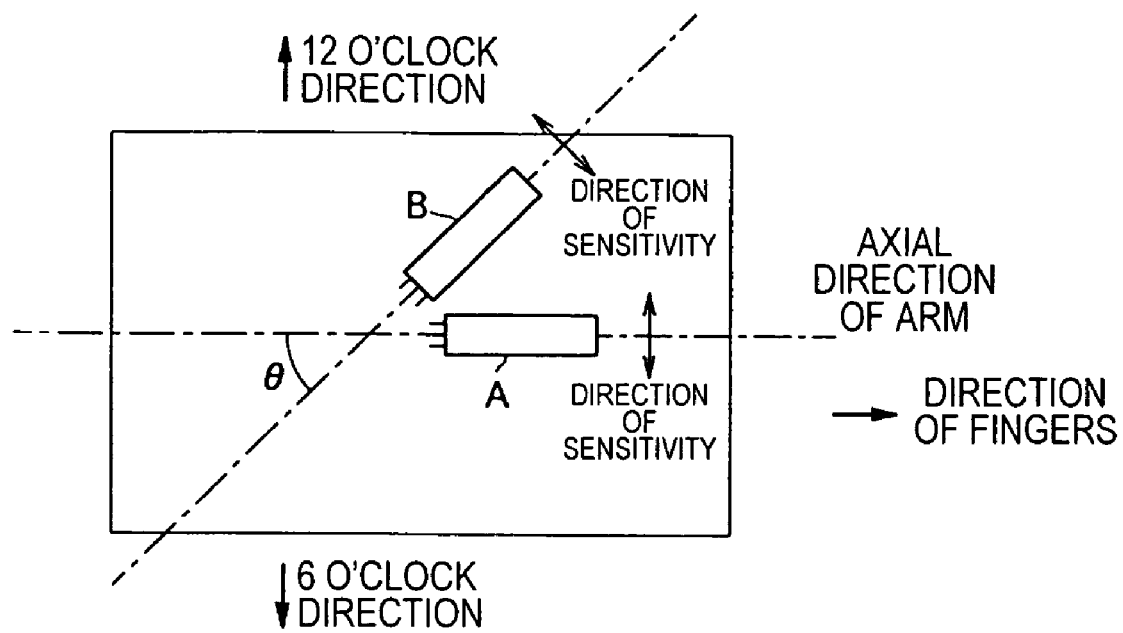
FIG. 2 is an explanatory diagram of the arrangement of a first body motion sensor and a second body motion sensor of a body motion detection device in accordance with a first embodiment of the present invention.

FIG. 2 is an explanatory diagram of the arrangement of the first acceleration sensor A and the second acceleration sensor B in accordance with the first embodiment. Two acceleration sensors are used in the first embodiment, where one acceleration sensor, the first acceleration sensor A, is primarily configured and arranged to detect body motion components during walking. The other acceleration sensor, the second acceleration sensor B, is primarily configured and arranged to detect body motion components during running. The first acceleration sensor A preferably constitutes a first body motion sensor, and the second acceleration sensor B preferably constitutes a second body motion sensor B. Also, the first and second acceleration sensors A and B together preferably constitute a body motion sensor unit.

As shown in FIG. 2, the first acceleration sensor A has the direction of sensitivity set in a direction substantially perpendicular to the axial direction of the arm. For example, when the body motion detection device is utilized in a wristwatch-type device, the direction of sensitivity is set in the direction of 12 o'clock and 6 o'clock.

Moreover, as shown in FIG. 2, the second acceleration sensor B is disposed such that the axial direction of the arm and a straight line substantially perpendicular to the direction of sensitivity form an angle θ. Consequently, the direction of sensitivity of the second acceleration sensor B is disposed so as to form an angle θ with the direction of sensitivity of the first acceleration sensor A. Here, the angle θ is set to about 50°±15° (a range between approximately 35° and approximately 65°). The logic behind setting the angle θ will be described later in more detail.

The basic principle for the arrangements or orientations of the first acceleration sensor A and the second acceleration sensor B, will next be described with reference to FIGS. 3 through 10. First, the relationship of output signals between the arm movement during walking and the arrangement (orientation) of an acceleration sensor will be described with reference to FIGS. 3 through 9 to explain the principle for the arrangement of the first acceleration sensor A that is primarily configured to detect the accelerations caused by motions during walking.

Figure 3:
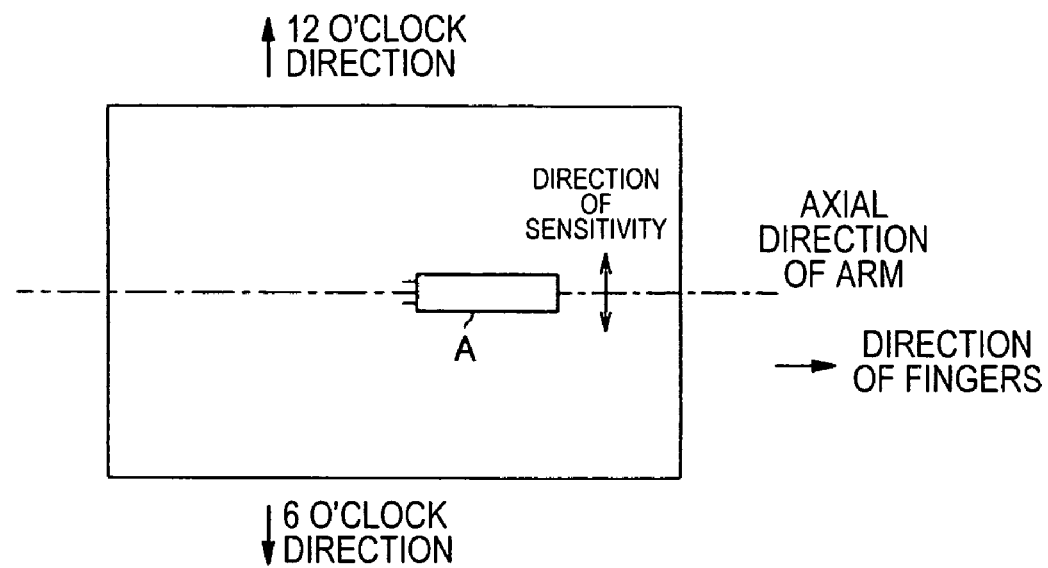
FIG. 3 is an explanatory diagram of the arrangement of an acceleration sensor when the direction of sensitivity of the first body motion sensor during walking is substantially perpendicular to the axial direction of the arm.
Figure 4:
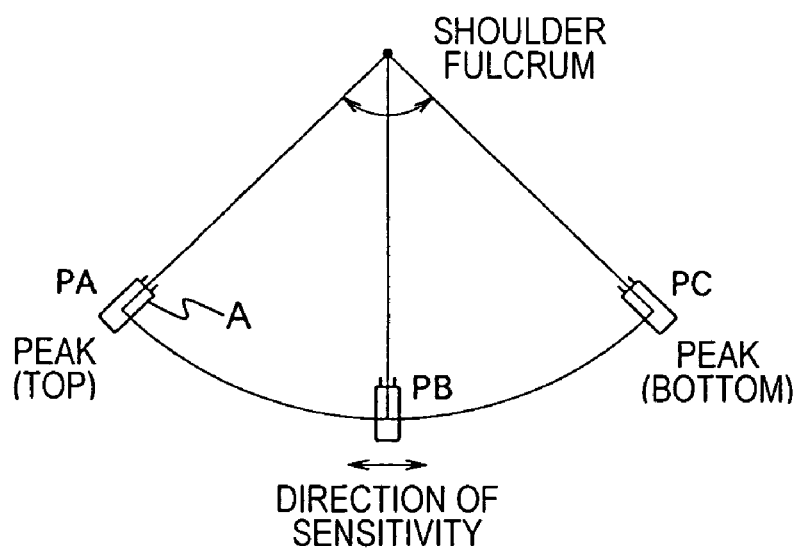
FIG. 4 is an explanatory diagram of the operation when an acceleration sensor is disposed with the direction of sensitivity substantially perpendicular to the axial direction of the arm.
Figure 5:
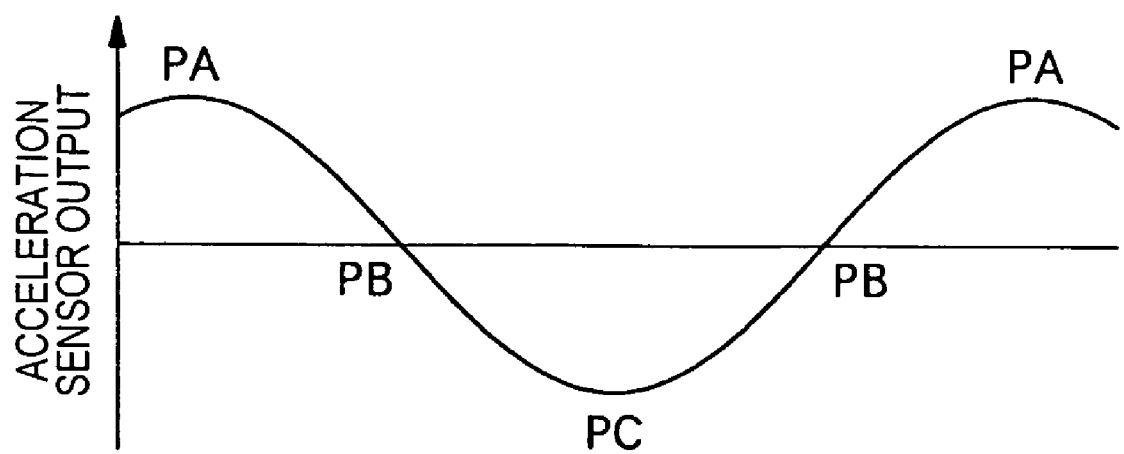
FIG. 5 is an explanatory diagram of the output signal of the acceleration sensor when the acceleration sensor is operated in the state shown in FIG. 4.

FIG. 3 is an explanatory diagram of the arrangement of the first acceleration sensor A when the direction of sensitivity of the first acceleration sensor A during walking is substantially perpendicular to the axial direction of the arm. FIG. 4 is an explanatory diagram of the operation when the first acceleration sensor A is disposed with the direction of sensitivity substantially perpendicular direction to the axial direction of the arm. Furthermore, FIG. 5 is an explanatory diagram of the output signal of the first acceleration sensor A when the first acceleration sensor A is operated in the state shown in FIG. 4.

As shown in FIG. 4, the arm moves in a nearly extended state during a normal walking. The direction of sensitivity of the first acceleration sensor A is set in a direction substantially perpendicular to the axial direction of the arm. Specifically, in the case where the body motion detection device is utilized in a wristwatch-type device, the direction of sensitivity is set in the direction of 12 o'clock and 6 o'clock. With the direction of sensitivity thus set, the first acceleration sensor A oscillates in a normal walking state to the front and back of the body with the shoulder joint as a fulcrum as seen in FIG. 4. Thus, the output signal of the first acceleration sensor A in which a back-and-forth motion of the arm corresponds to a single period, as shown in FIG. 5. Therefore, according to the arrangement and orientation of the first acceleration sensor A shown in FIG. 3, the first harmonic of the body motion components during walking can be detected.

Figure 6:
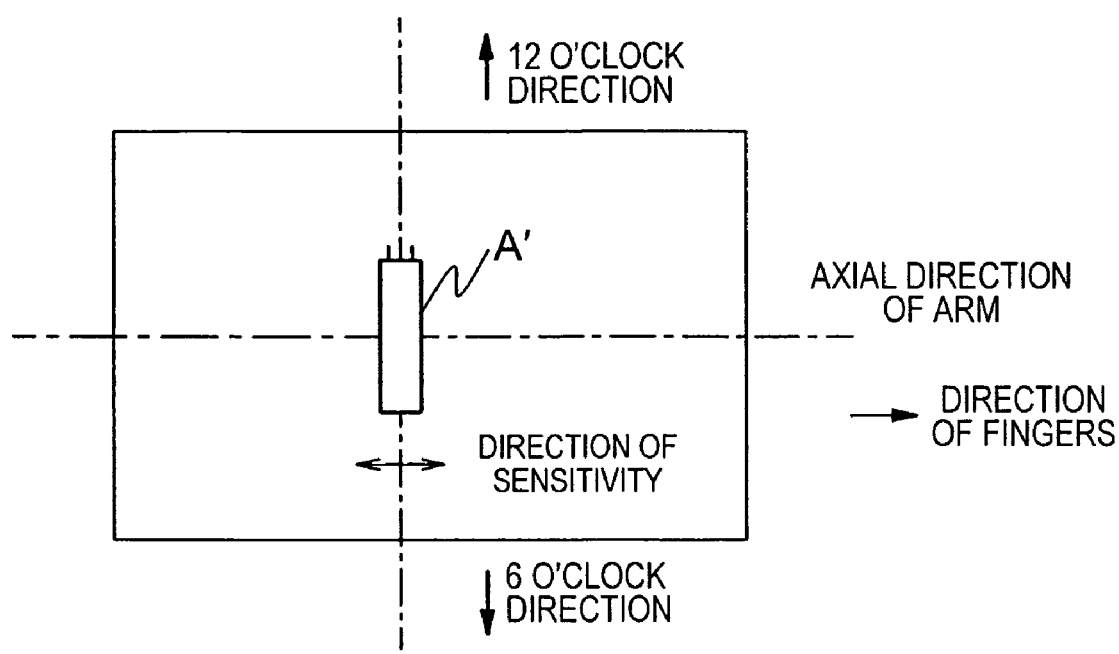
FIG. 6 is an explanatory diagram of the arrangement of an acceleration sensor when the direction of sensitivity of the acceleration sensor during walking is the axial direction of the arm.
Figure 7:
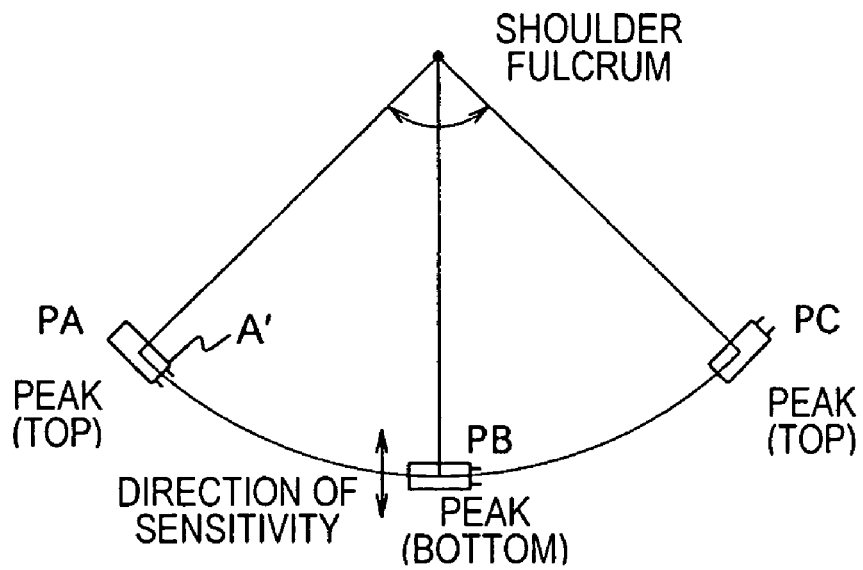
FIG. 7 is an explanatory diagram of the operation when the direction of sensitivity is the axial direction of the arm.
Figure 8:
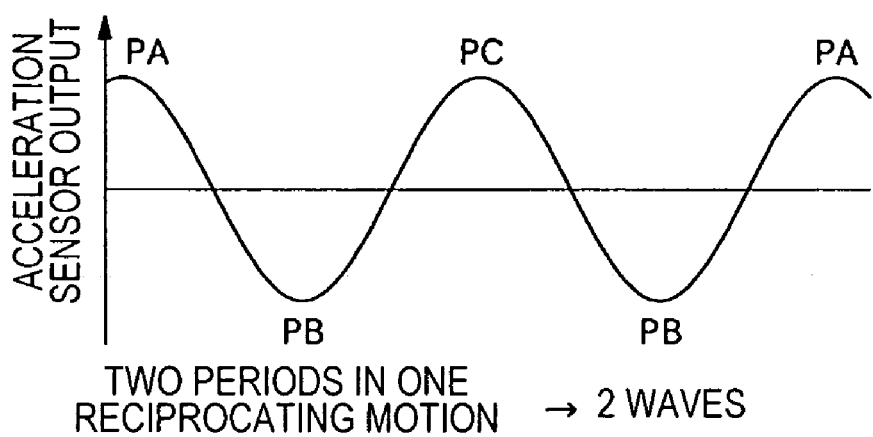
FIG. 8 is an explanatory diagram of the output signal of the acceleration sensor when the acceleration sensor is operated in the state shown in FIG. 7.

FIG. 6 is an explanatory diagram of an arrangement of a hypothetical acceleration sensor A' shown as a comparative example of the arrangement of the first acceleration sensor A. The direction of sensitivity of the hypothetical acceleration sensor A' is set in a direction substantially identical to the axial direction of the arm during walking. FIG. 7 is an explanatory diagram of the operation of the hypothetical acceleration sensor A' in which the direction of sensitivity is in a direction substantially identical to the axial direction of the arm. Furthermore, FIG. 8 is an explanatory diagram of the output signals of the acceleration sensor A' when the acceleration sensor A' is operated in the state shown in FIG. 7.

As shown in FIG. 7, the arm moves in a nearly extended state during normal walking. The hypothetical acceleration sensor A' has the direction of sensitivity set in a direction that substantially coincides with the axial direction of the arm. Specifically, when the body motion detection device is utilized in a wristwatch-type device, the direction of sensitivity is set in the direction of 9 o'clock and 3 o'clock. With the direction of sensitivity thus set, the hypothetical acceleration sensor A' oscillates to the front and back of the body in a normal walking state with the shoulder joint as a fulcrum as shown in FIG. 7. Thus, the output signal of the acceleration sensor A' is a signal that corresponds to two periods of the back-and-forth motion of the arm, as shown in FIG. 8. Therefore, according to the arrangement of the hypothetical acceleration sensor A' shown in FIG. 6, the second harmonic of the body motion components during walking is detected.

Figure 9:
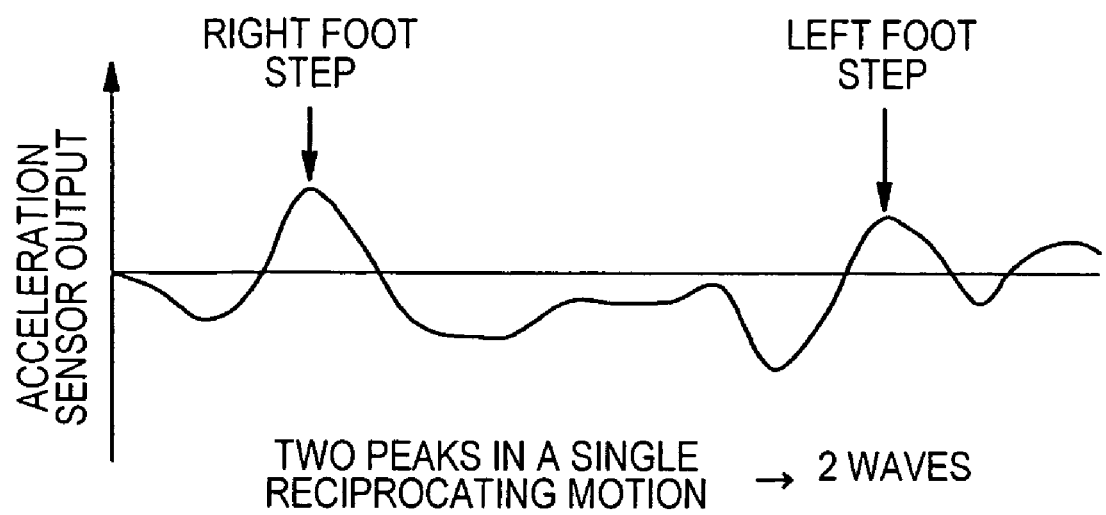
FIG. 9 is an explanatory diagram of the output signal waveform of an acceleration sensor when a user is stepping with the arms hanging down.

FIG. 9 shows the output signal waveform of an acceleration sensor when the user is stepping with the arm hanging down. In this case, hand movement due to landing of the feet is detected irrespective of the arrangement (orientation) of the acceleration sensor. Thus, a peak is detected twice within a single step (one each for the landings of right foot and left foot). Therefore, the second harmonic of the body motion components is detected from leg movements during walking.

Based on the above results including the basic relationship between the arrangement of the first acceleration sensor A and the acceleration output, it has been discovered that the first acceleration sensor A should be oriented such that the direction of sensitivity of the first acceleration sensor A is aligned with the peripheral direction of the turning direction of the arm in order to detect the first harmonic during walking.

In view of the above, in the present embodiment, based on the movement of the arm during walking, the first acceleration sensor A is oriented so as to have the direction of sensitivity in a direction substantially perpendicular to the axial direction of the arm in order to detect the first harmonic during walking, as shown in FIG. 2.

Figure 10:
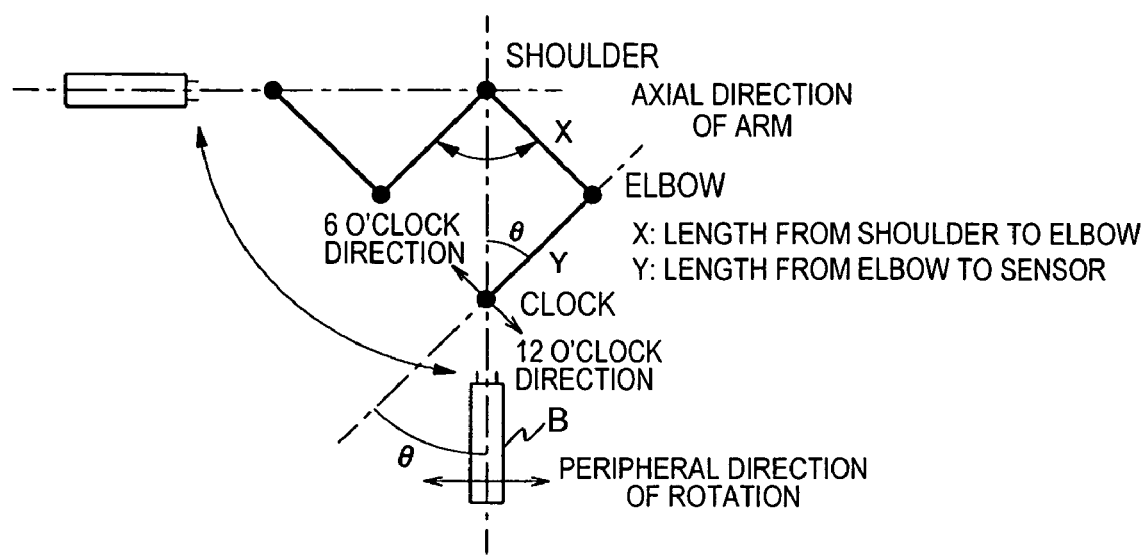
FIG. 10 is an explanatory diagram of the arrangement of the acceleration sensor during walking in the body motion detection device in accordance with the first embodiment of the present invention.

Next, the basic principle for the arrangement and orientation of the second acceleration sensor B will be described with reference to FIG. 10. FIG. 10 is an explanatory diagram of the arrangement of the second acceleration sensor B in accordance with the first embodiment. The second acceleration sensor B is primarily configured and arranged to detect motion during running.

The second acceleration sensor B is disposed such that the direction of sensitivity of the second acceleration sensor B is aligned with a direction substantially perpendicular to a straight line that joins the shoulder joint and the wrist when the arm is bent at a certain angle during running. In the present embodiment, the second acceleration sensor B is oriented such that the certain angle formed by the upper arm and the forearm when the arm is bent is preferably about 90° as seen in FIG. 10. With this arrangement, the second acceleration sensor B is configured and arranged to primarily detect the first harmonic based on the arm movement during running.

Specifically, as shown in FIG. 10, when the length from the shoulder joint to the elbow joint (approximately equal to the length of the upper arm) is X, and the length from the elbow joint to the wrist (accurately the acceleration sensor) (approximately equal to length of the forearm) is Y, the second acceleration sensor B is disposed such that the angle θ satisfies the following Equation 1.

$$\theta = \tan^{-1}(X/Y) \quad \text{(Equation 1)}$$

For a more ideal arrangement, the direction perpendicular to a straight line between the shoulder joint (center of arm rotation in the shoulder) and the second acceleration sensor B is preferably set as the direction of sensitivity for the second acceleration sensor B in accordance with a prescribed degree to which the arm is bent during running for each user.

Accordingly, as shown in FIG. 2, the second acceleration sensor B is disposed such that the axial direction of the arm and the straight line substantially perpendicular to the direction of sensitivity form the angle θ. As a result, the direction of sensitivity of the second acceleration sensor B during running moves along the peripheral direction of the rotation of the arm (wrist) during running.

As a result, the first acceleration sensor A and the second acceleration sensor B in the present embodiment are disposed such that the first harmonic can be substantially detected during both walking and running. Therefore, the pitch can be accurately calculated from the detected first harmonic regardless of whether the user is walking or running. Therefore, undesirable situations are avoided in which the first harmonic fails to be detected and erroneous results are obtained due to the inability to distinguish between the first harmonic and the second harmonic.

Next, a wristwatch-type information processing device or a wristwatch-type information device 1 will be described as an example of a device having the body motion detection device in accordance with the first embodiment of the present invention.

Figure 11:
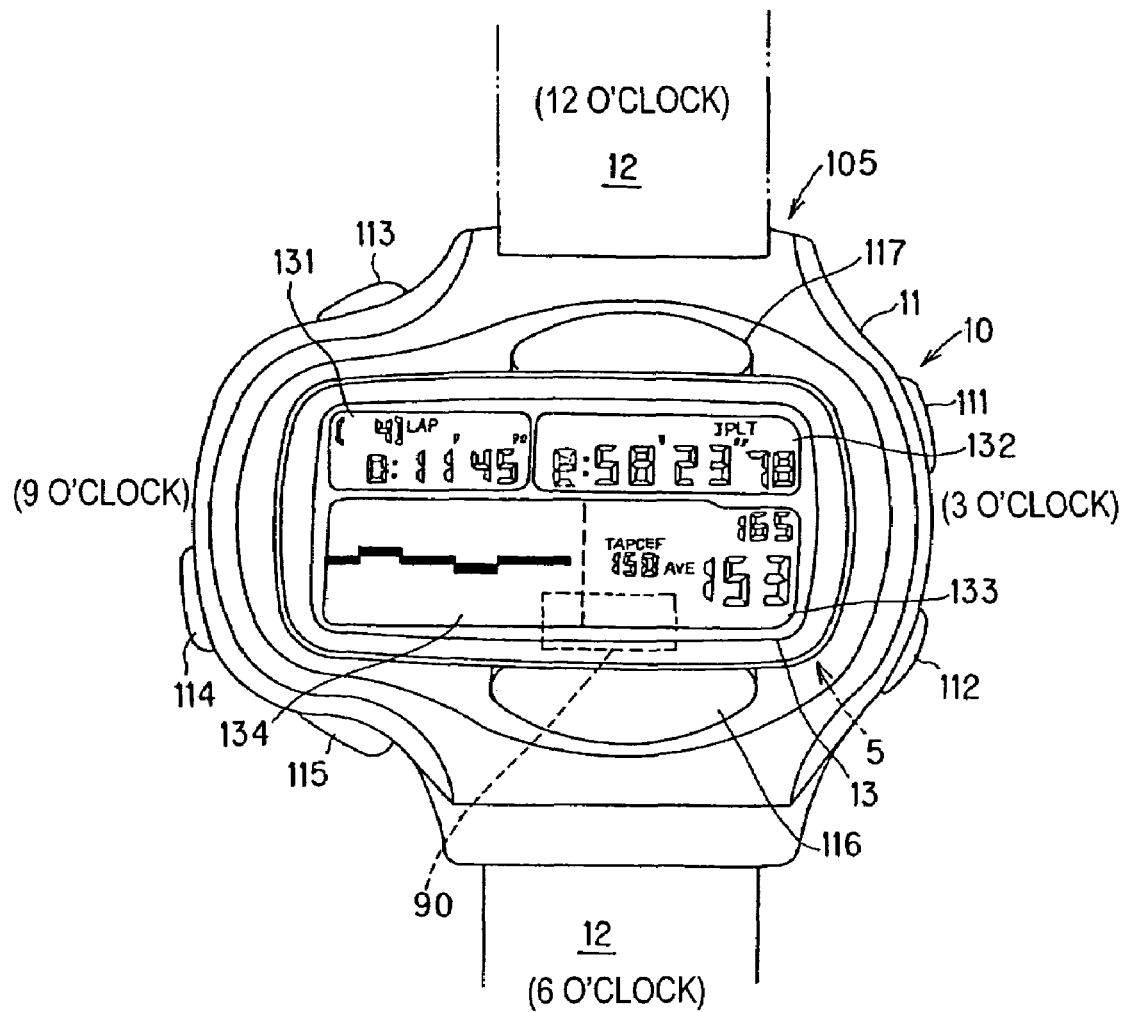
FIG. 11 is a plan view of a main body of a wristwatch-type information device (pitch meter) equipped with a pitch detection device comprising the body motion detection device in accordance with the first embodiment of the present invention.

FIG. 11 is a plan view showing a main body 10 of the wristwatch-type information device 1. This wristwatch-type information device 1 is equipped with a microprocessor, ROM, RAM, and the like, and performs the functions of an information device as a computer.

In FIG. 11, the main body 10 of the wristwatch-type information device 1 is provided with a band or wristband 12 for wearing the wristwatch-type information device 1 around a wrist or an arm of the user in a removable manner.

The main body 10 has a resinous watchcase 11 (main body case), and the outer surface of the watchcase 11 is provided with a liquid crystal display device 13 (display device) with an EL backlight for displaying the pitch during running or walking, the pulse rate and other such pulse information and the like in addition to the current time and date.

The liquid crystal display device 13 includes a first segment display area 131 disposed on the upper left side of the display surface in FIG. 11, a second segment display area 132 disposed on the upper right side, a third segment display area 133 disposed on the lower right side, and a dot display area 134 disposed on the lower left side. The liquid crystal display device 13 is configured and arranged to graphically display various types of information in the dot display area 134.

A body motion sensor unit 90 for determining pitch is installed in the watchcase 11, and a first body motion sensor 401 and a second body motion sensor 405 are installed in the body motion sensor unit 90. The first body motion sensor 401 and second body motion sensor 405 correspond to the first acceleration sensor A and the second acceleration sensor B, respectively. In other words, the first and second body motion sensors 401 and 405 are oriented with respect to the arm of the user when the wristwatch-type information device 1 is attached to the wrist of the user in the same manner as the first and second acceleration sensors A and B as shown in FIG. 2.

The interior of the watchcase 11 is provided with a control section 5 for performing various types of control or data processing. The control section 5 is configured to determine the pitch based on the detection results (body motion signals) from the body motion sensor unit 90, and display the results on the liquid crystal display device 13. Therefore, the wristwatch-type information device 1 has a pitch detection device 400 for determining the pitch of the user that utilizes the body motion detection device of the first embodiment of the present invention.

Since a timing circuit is also provided to the control section 5, the wristwatch-type information device 1 can be arranged to display regular time, lap time, split time, and the like on the liquid crystal display device 13.

Moreover, the wristwatch-type information device 1 preferably includes button switches 111–115 for setting the time, changing the display mode, and performing other such external operations provided to the external peripheral portion of the watchcase 11. Also, large button switches 116 and 117 are preferably provided to the surface of the watchcase 11 as seen in FIG. 11.

Figure 12:
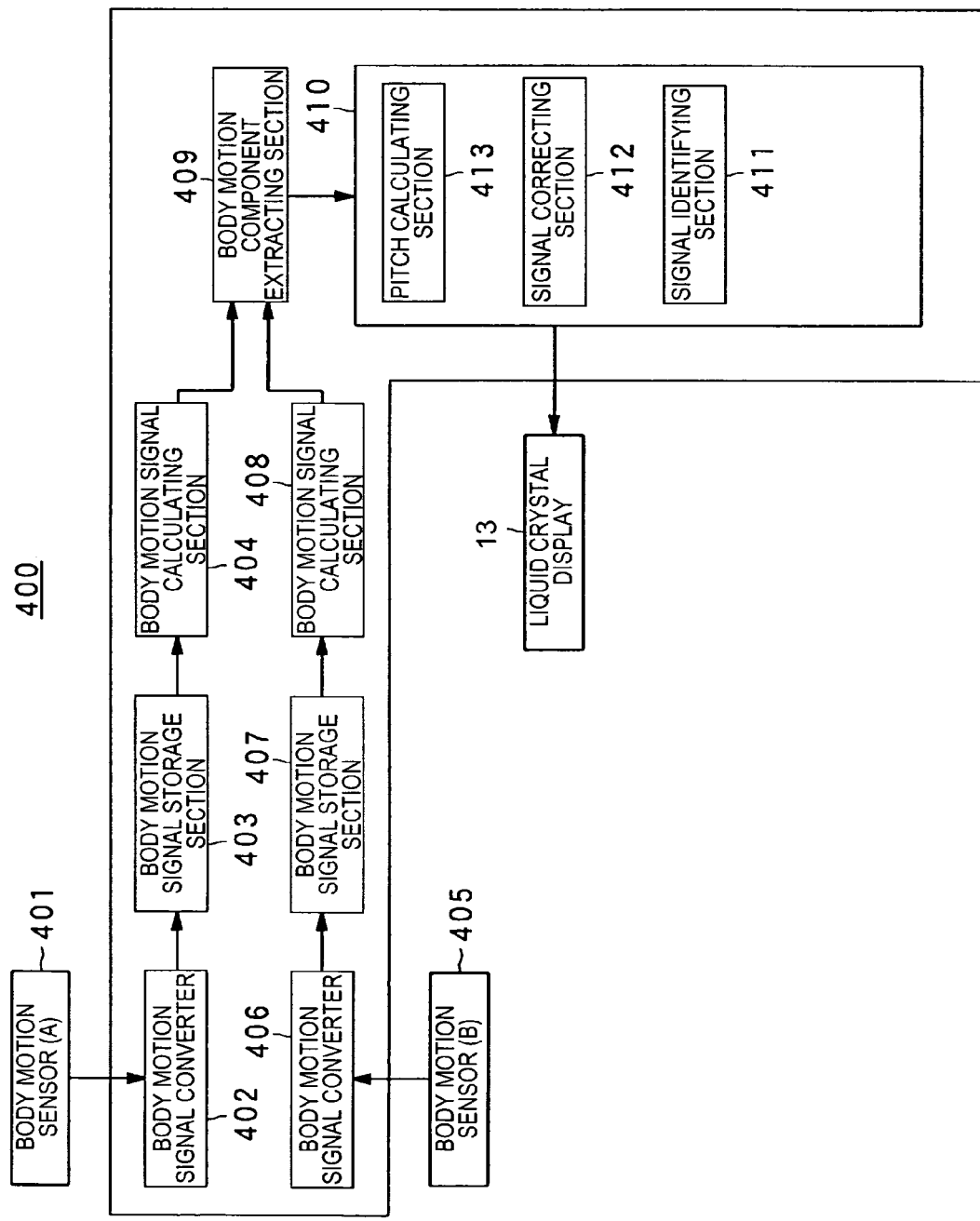
FIG. 12 is a schematic structural block diagram of the pitch detection device comprising the body motion detection device in accordance to the first embodiment of the present invention.

FIG. 12 is a schematic structural block diagram of the pitch detection device 400 of the first embodiment. The pitch detection device 400 basically comprises the first body motion sensor 401, a first body motion signal converter 402, a first body motion signal storage section 403, a first body motion signal calculating section 404, the second body motion sensor 405, a second body motion signal converter 406, a second body motion signal storage section 407, a second body motion signal calculating section 408, a body motion component extracting section 409, and a pitch calculating section 410.

As mentioned above, the first body motion sensor 401 corresponds to the first acceleration sensor A described above. In other words, the first body motion sensor 401 is preferably oriented so as to have the direction of sensitivity in a direction substantially perpendicular to the axial direction of the arm.

The first body motion signal converter 402 is configured and arranged to have a signal amplifying section for amplifying the output signals of the first body motion sensor 401 at a specific factor, and an A/D converter for performing analog/digital conversion on the output signals from the signal amplifying section and outputting the result as first body motion signal data to the first body motion signal storage section 403.

The first body motion signal storage section 403 is configured and arranged to store the first body motion signal data received from the first body motion signal converter 402.

The first body motion signal calculating section 404 is configured and arranged to read the first body motion signal data from the first body motion signal storage section 403 and perform frequency analysis by FFT processing to output the FFT analysis data to the body motion component extracting section 409.

The second body motion sensor 405 corresponds to the second acceleration sensor B described above. In other words, the second body motion sensor 405 is preferably oriented such that the direction of a straight line that joins the shoulder joint and the wrist of the user when the angle formed by the upper arm and the forearm is about 90° is set to be the axial direction, and the direction of sensitivity is aligned in a direction substantially perpendicular to the axial direction.

The second body motion signal converter 406 is configured and arranged to have a signal amplifying section for amplifying output signals from the second body motion sensor 405 at a specific factor, and an A/D converter for performing analog/digital conversion on the output signals from the signal amplifying section and outputting the result as second body motion signal data to the second body motion signal storage section 407.

The second body motion signal storage section 407 is configured and arranged to store the second body motion signal data received from the body motion signal converter 406.

The second body motion signal calculating section 408 is configured and arranged to read the second body motion signal data from the second body motion signal storage section 407 and perform frequency analysis by FFT processing to output the FFT analysis data to the body motion component extracting section 409.

The body motion component extracting section 409 is configured and arranged to extract the data originating in the body motion components from the data obtained based on the inputted frequency analysis, and output the result to the pitch calculating section 410.

The pitch calculating section 410 is configured and arranged to calculate the pitch from the frequency of the inputted body motion components and display the results on the liquid crystal display device 13. In the present embodiment, the pitch calculating section 410 basically comprises a signal identifying section 411, a signal correcting section 412, and a pitch computing section 413.

The signal identifying section 411 is configured and arranged to identify a signal with the lowest frequency as a possible first harmonic or a reference wave from among signals whose power has a certain minimum factor in relation to the signal with the highest power.

The signal correcting section 412 is configured and arranged to determine or correct the first harmonic based on the frequency of the possible first harmonic signal and the strength of the body motion signals. Thus, signal identifying section 411 and the signal correcting section 412 preferably constitute a reference wave determining section.

The pitch computing section 413 is configured and arranged to calculate the pitch based on the first harmonic determined (corrected) by the signal correcting section 412.

In the pitch calculating section 410 thus configured, the signals outputted from the body motion component extracting section 409 have a spectrum such as the one shown in a simplified manner in FIG. 1. When the pitch is determined from these spectra, the pitch calculating section 410 is configured to determine the pitch by performing calculations that are appropriate in either case regardless of the differences between the spectrum during walking and the spectrum during running.

Next, the specific process for detecting pitch will be described. First, the results of analyzing the frequency of the output signals from the first body motion sensor 401 and the second body motion sensor 405 will be described separately in cases in which the steps and arm movements are strong and in cases in which the steps and arm movements are light during walking or running.

Figure 13:
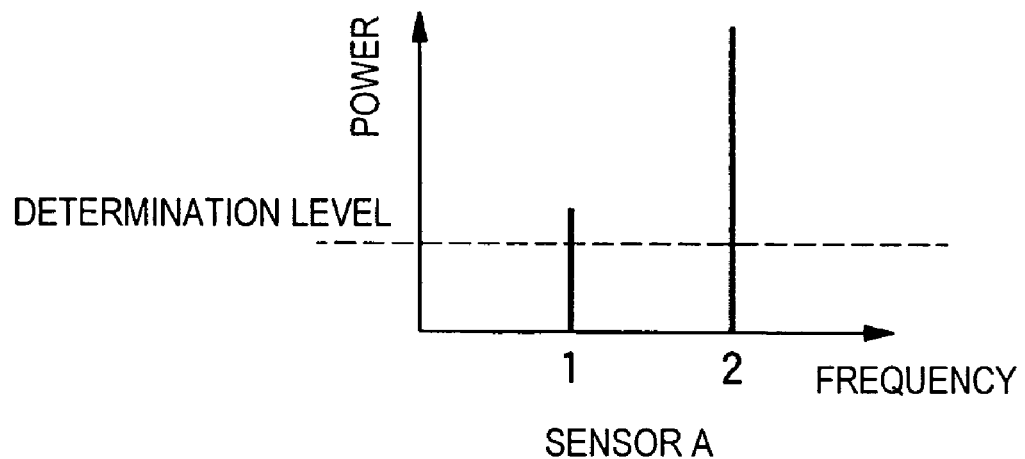
FIG. 13 is a simplified diagram illustrating a frequency analysis result for the output signals of the first body motion sensor during walking when there is little arm movement in accordance with the first embodiment of the present invention.
Figure 14:
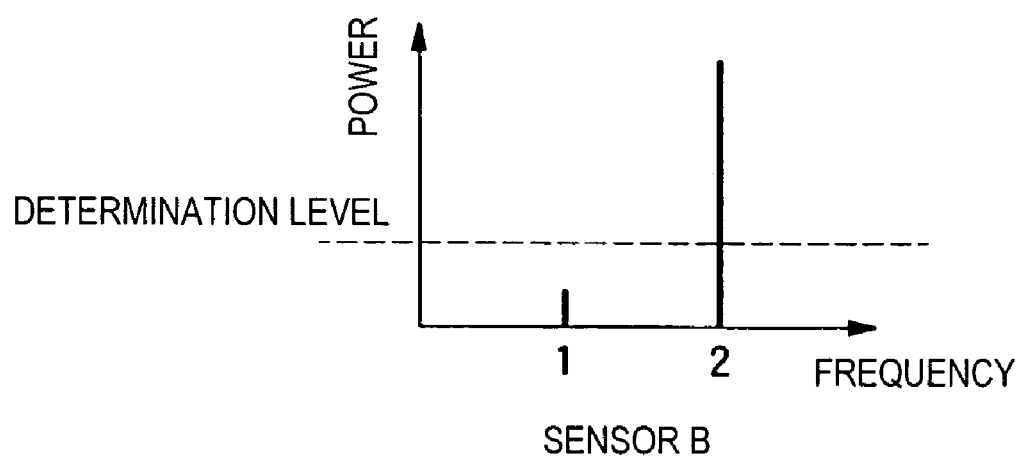
FIG. 14 is a simplified diagram illustrating a frequency analysis result for the output signals of the second body motion sensor during walking when there is little arm movement in accordance with the first embodiment of the present invention.

FIG. 13 shows frequency analysis results for the output signals of the first body motion sensor 401 during walking when there is little arm movement. FIG. 14 shows frequency analysis results for the output signals of the second body motion sensor 405 during walking when there is little arm movement.

As seen in FIG. 13, when there is little arm movement during walking, the second harmonic (equivalent to pitch) is detected at a determination level that is greater than that of the first harmonic by the output signals from the first body motion sensor 401. Also, the first harmonic is also detected at higher than the determination level, as shown in FIG. 13. As seen in FIG. 14, when there is little arm movement during walking, the second harmonic is detected at a determination level that is substantially greater than that of the first harmonic from the output signals from the second body motion sensor 405. The first harmonic is detected at less than the determination level.

Figure 15:
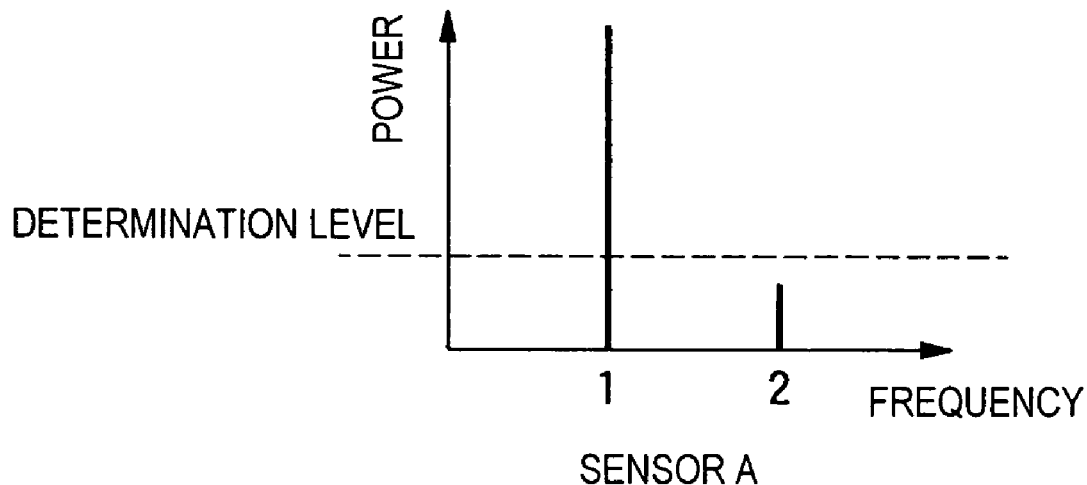
FIG. 15 is a simplified diagram illustrating a frequency analysis result for the output signals of the first body motion sensor during walking when stepping is light and arm movement is big in accordance with the first embodiment of the present invention during walking when there are light steps and much arm movement.
Figure 16:
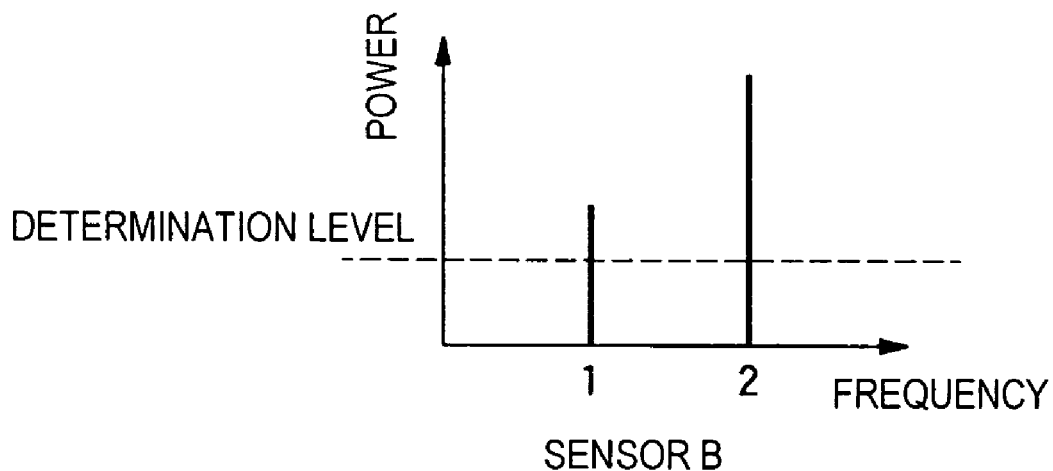
FIG. 16 is a simplified diagram illustrating a frequency analysis result for the output signals of the second body motion sensor during walking when stepping is light and arm movement is big in accordance with the first embodiment of the present invention.

FIG. 15 shows frequency analysis results for the output signals of the first body motion sensor 401 during walking when stepping is weak and arm movement is big. FIG. 16 shows frequency analysis results for the output signals of the second body motion sensor 405 during walking when stepping is weak and arm movement is big.

In this case, the first harmonic is detected at a determination level that is substantially greater than that of the second harmonic (equivalent to pitch) from the output signals from the first body motion sensor 401 as shown in FIG. 15. The second harmonic is detected at less than the determination level. As shown in FIG. 16, the second harmonic is detected at a determination level that is greater than that of the first harmonic from the output signals from the second body motion sensor 405. The first harmonic is also detected at a level above the determination level, as shown in FIG. 16.

Figure 17:
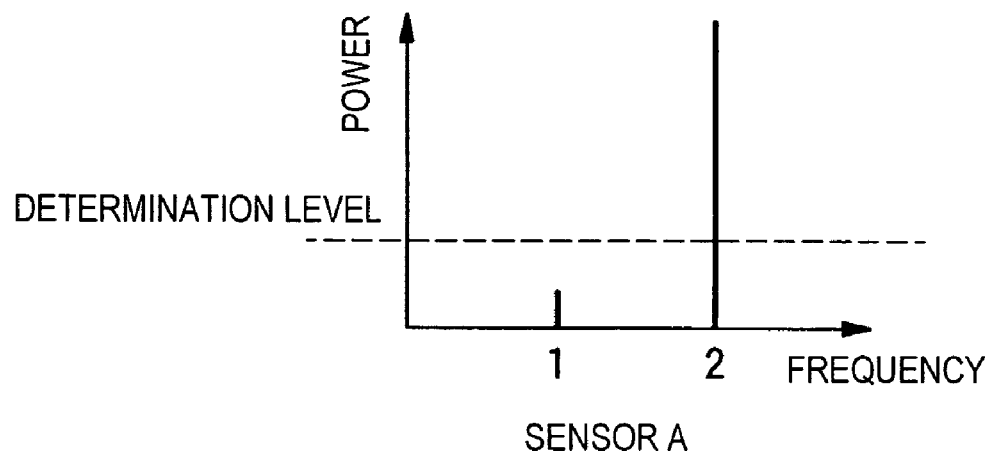
FIG. 17 is a simplified diagram illustrating a frequency analysis result for the output signals of the first body motion sensor during running when there is little arm movement in accordance with the first embodiment of the present invention.
Figure 18:
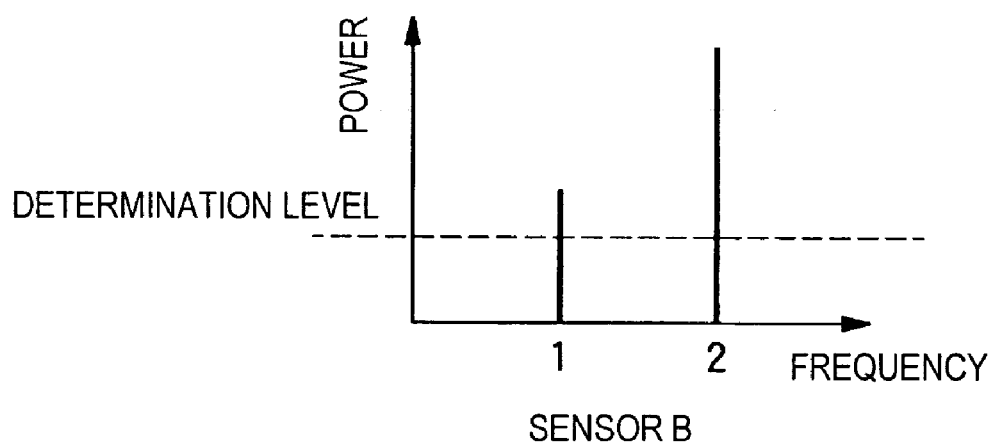
FIG. 18 is a simplified diagram illustrating a frequency analysis result for the output signals of the second body motion sensor during running when there is little arm movement in accordance with the first embodiment of the present invention.

FIG. 17 shows frequency analysis results for the output signals of the first body motion sensor 401 during running when there is little arm movement. FIG. 18 shows frequency analysis results for the output signals of the second body motion sensor 405 during running when there is little arm movement.

As shown in FIG. 17, when there is little arm movement during running, the second harmonic (equivalent to pitch) is detected at a determination level that is substantially greater level than that of the first harmonic from the output signals from the first body motion sensor 401. The first harmonic is detected at less than the determination level. As shown in FIG. 18, the second harmonic is detected at a determination level that is greater than that of the first harmonic from the output signals from the second body motion sensor 405. The first harmonic is also detected at a level greater than the determination level, as shown in FIG. 18.

Figure 19:
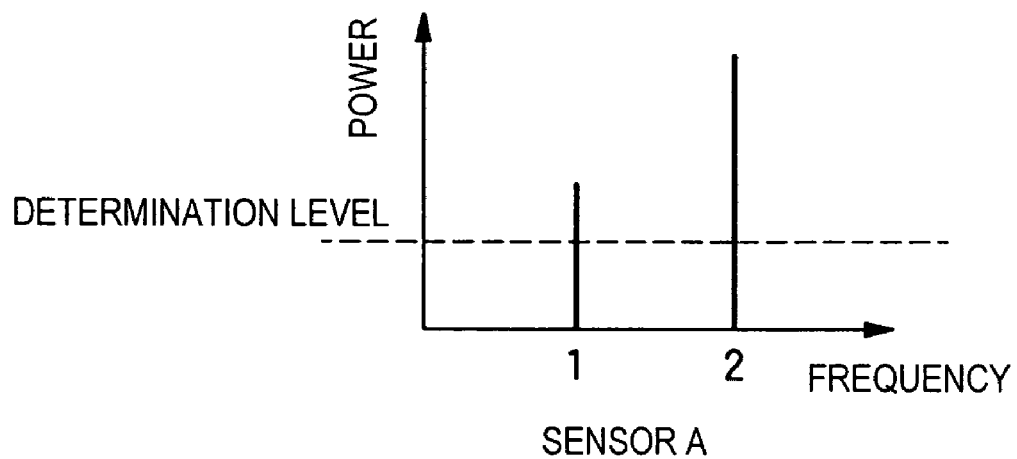
FIG. 19 is a simplified diagram illustrating a frequency analysis result for the output signals of the first body motion sensor during running when stepping is light and arm movement is big in accordance with the first embodiment of the present invention.
Figure 20:
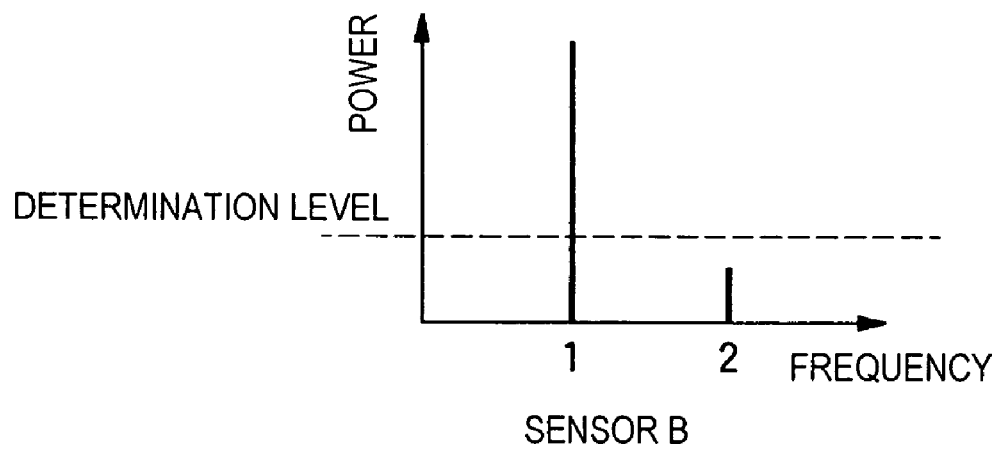
FIG. 20 is a simplified diagram illustrating a frequency analysis result for the output signals of the second body motion sensor during running when stepping is light and arm movement is big in accordance with the first embodiment of the present invention.

FIG. 19 shows frequency analysis results for the output signals of the first body motion sensor 401 during walking when stepping is weak and arm movement is big. FIG. 20 shows frequency analysis results for the output signals of the second body motion sensor 405 during walking when stepping is weak and arm movement is big.

In this case, the second harmonic is detected at a determination level that is greater than that of the first harmonic from the output signals from the first body motion sensor 401, as shown in FIG. 19. The first harmonic is also detected at a level greater than the determination level. As shown in FIG. 20, the first harmonic is detected at a determination level that is substantially greater than that of the second harmonic from the output signals from the second body motion sensor 405. The second harmonic is also detected at a level below the determination level.

Figure 21:
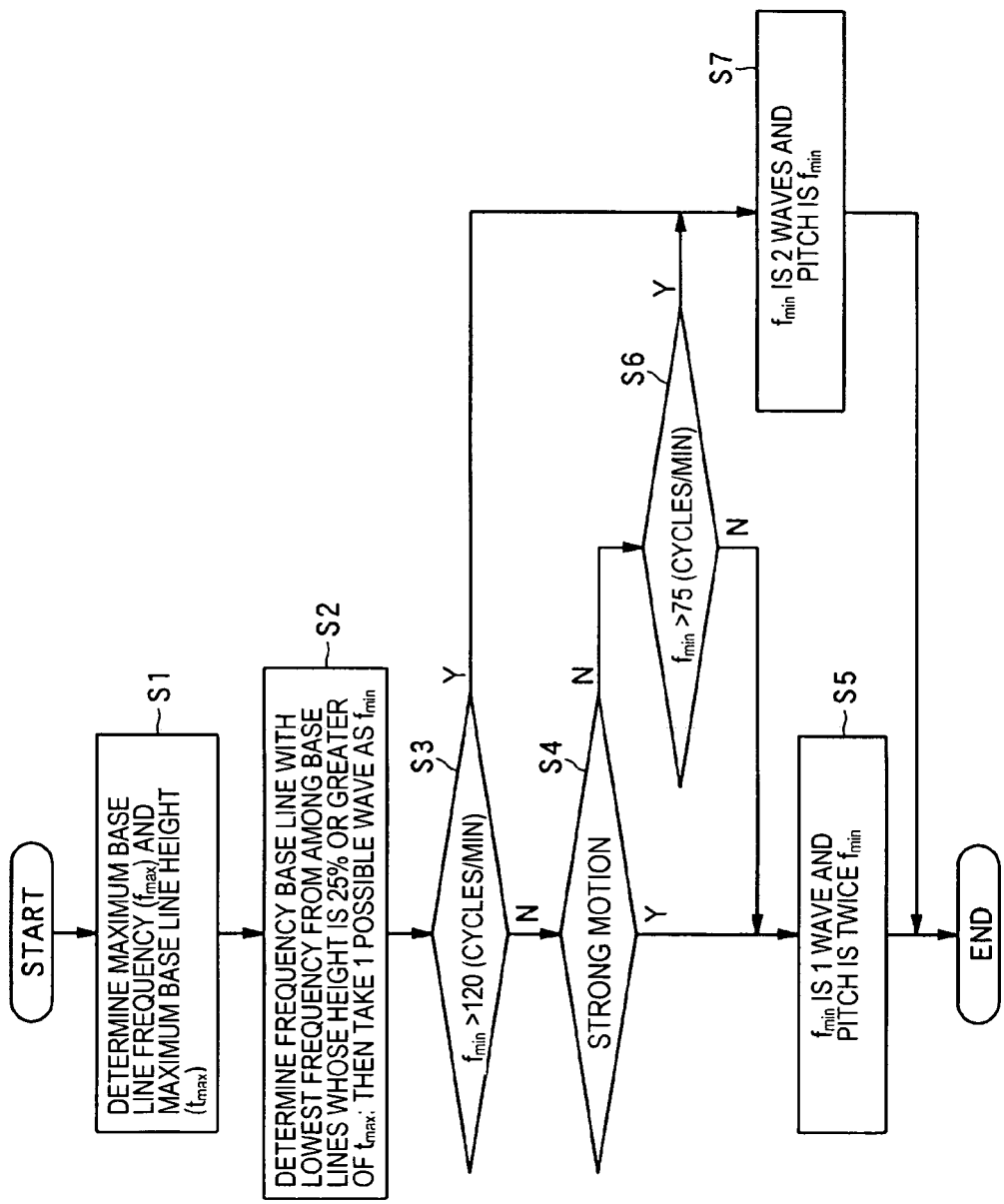
FIG. 21 is a flow chart illustrating a pitch calculation process in accordance with the first embodiment of the present invention.

Next, the pitch calculation process will be described. FIG. 21 is a pitch calculation process flow chart in accordance with the first embodiment.

First, the signal identifying section 411 of the pitch calculating section 410 is configured to determine the height $t_{max}$ and the frequency $f_{max}$ of the signal with the highest or maximum power (maximum base line) based on the output signals from the body motion component extracting section 409 (step S1).

Next, the signal identifying section 411 is configured to determine the frequency of a base line with the lowest frequency from among the signals whose power (height) has a certain minimum factor in relation to signals with the maximum power (maximum base line). For example, the base line with the lowest frequency is preferably identified from among the base lines whose height is 25% or greater of height $t_{max}$. Then, the identified base line with the lowest frequency is set as the possible first harmonic frequency $f_{min}$ (step S2).

Next, the signal identifying section 411 is configured to determine whether or not the possible first harmonic frequency $f_{min}$ has a frequency greater than 120 (cycles/min) (step S3).

When the possible first harmonic frequency $f_{min}$ has a frequency greater than 120 (cycles/min) in stepS3 (step S3; Yes), the signal identifying section 411 is configured to conclude that the possible first harmonic frequency $f_{min}$ is a frequency of the second harmonic. As a result, it is assumed that the pitch is equal to the possible first harmonic frequency $f_{min}$ (i.e., the second harmonic), and the process is completed (step S7). In this case, the reason that the possible first harmonic frequency $f_{min}$ is concluded to be the frequency of the second harmonic when the possible first harmonic frequency $f_{min}$ is greater than 120 (cycles/min) is because if the possible first harmonic frequency $f_{min}$ is set to be the first harmonic, the pitch will be twice of the frequency of the possible first harmonic because the pitch corresponds to the second harmonic. Thus, the pitch will be greater than 240 (cycles/min), which is not a realistic value.

When the possible first harmonic frequency $f_{min}$ has a frequency less than 120 (cycles/min) in step S3, the pitch calculating section 410 is configured to determine whether or not the body motion is strong based on the output signals from the first body motion sensor 401 and the second body motion sensor 405 (step S4).

When the body motion is determined to be strong in step S4, it is assumed that the user is running. Thus, the pitch calculating section 410 is configured to determine that the possible first harmonic frequency $f_{min}$ is the first harmonic.

Thus, the pitch is calculated as a value equal to twice the possible first harmonic frequency $f_{min}$, and the process is completed (step S5).

When the body motion is determined to be not strong in step S4, it is assumed that the user is walking. Then, the signal identifying section 411 is configured to determine whether or not the possible first harmonic frequency $f_{min}$ has a frequency greater than 75 (cycles/min) (step S6).

When the possible first harmonic frequency $f_{min}$ has a frequency greater than 75 (cycles/min) in step S6 (step S6; Yes), the signal identifying section 411 is configured to determine that the possible first harmonic frequency $f_{min}$ is a frequency of the second harmonic. As a result, the pitch is calculated to be equal to the possible first harmonic frequency $f_{min}$ (second harmonic), and the process is completed (step S7). In this case, the reason that the possible first harmonic frequency $f_{min}$ can be determined to be the frequency of the second harmonic when the possible first harmonic frequency $f_{min}$ is greater than 75 (cycles/min) is because if the possible first harmonic frequency $f_{min}$ is set to be the first harmonic the pitch is greater than 150 (cycles/min), which is not a realistic value.

When the possible first harmonic frequency $f_{min}$ has a frequency less than 75 (cycles/min) in step S6 (step S6; No), the pitch calculating section 410 is configured to determine that the possible first harmonic frequency $f_{min}$ is the first harmonic. Thus, the pitch is calculated as a value equal to twice the possible first harmonic frequency $f_{min}$, and the process is completed (step S5).

Figure 22:
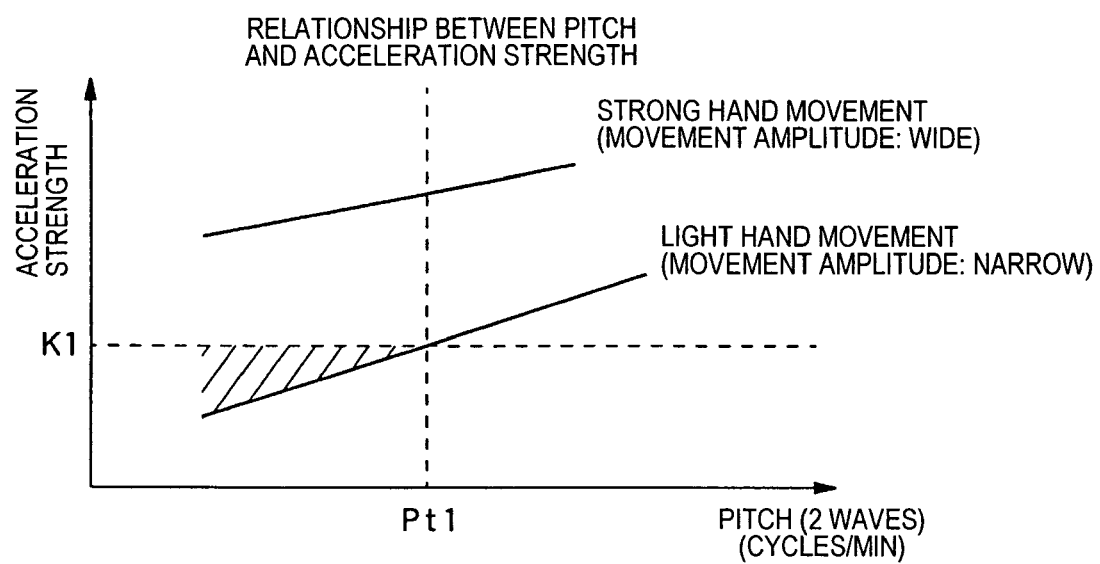
FIG. 22 is an explanatory diagram of the relationship between pitch and acceleration strength.

FIG. 22 is an explanatory diagram of the relationship between the pitch and the strength of acceleration. When the oscillation of the arm movement is the same as shown in FIG. 22, the acceleration output increases at higher pitches. It is clear from this fact that the pitch is Pt1 or less when the acceleration is K1 or less.

Figure 23:
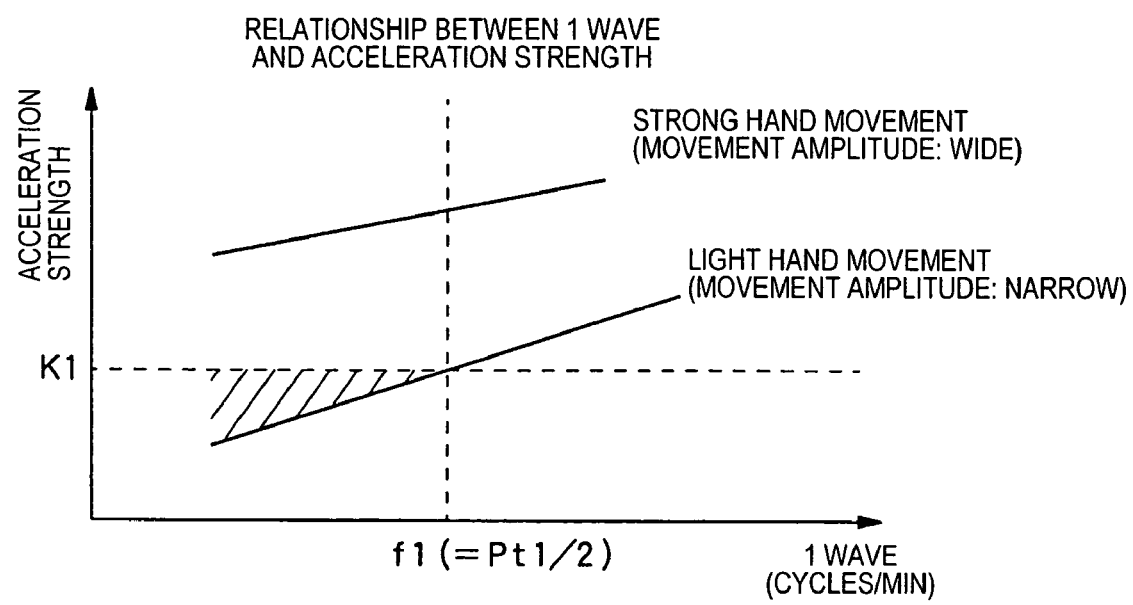
FIG. 23 is an explanatory diagram of the relationship between the first harmonic and acceleration strength.

FIG. 23 is an explanatory diagram of the relationship between the first harmonic and acceleration strength. The same applies to the relationship between the frequency of the first harmonic and the strength of acceleration as shown in FIG. 23. If the strength of acceleration is K1 or less, it is concluded that the frequency of the first harmonic is f1 or less. In other words, the frequency of the first harmonic does not reach f1 or greater when the strength of acceleration is K1 or less. Therefore, it is concluded that the possible first harmonic frequency $f_{min}$ is the frequency of the second harmonic if the possible first harmonic frequency $f_{min}$ reaches f1 or greater.

As described above, the pitch can be accurately measured according to the first embodiment without distinguishing between running and walking. In other words, pitch can be detected reliably with good detection precision because the body motion can be detected with good precision during both walking and running. Also, labor can be reduced for the user because there is no need for operations to switch between running and walking.

Second Embodiment

Figure 24:
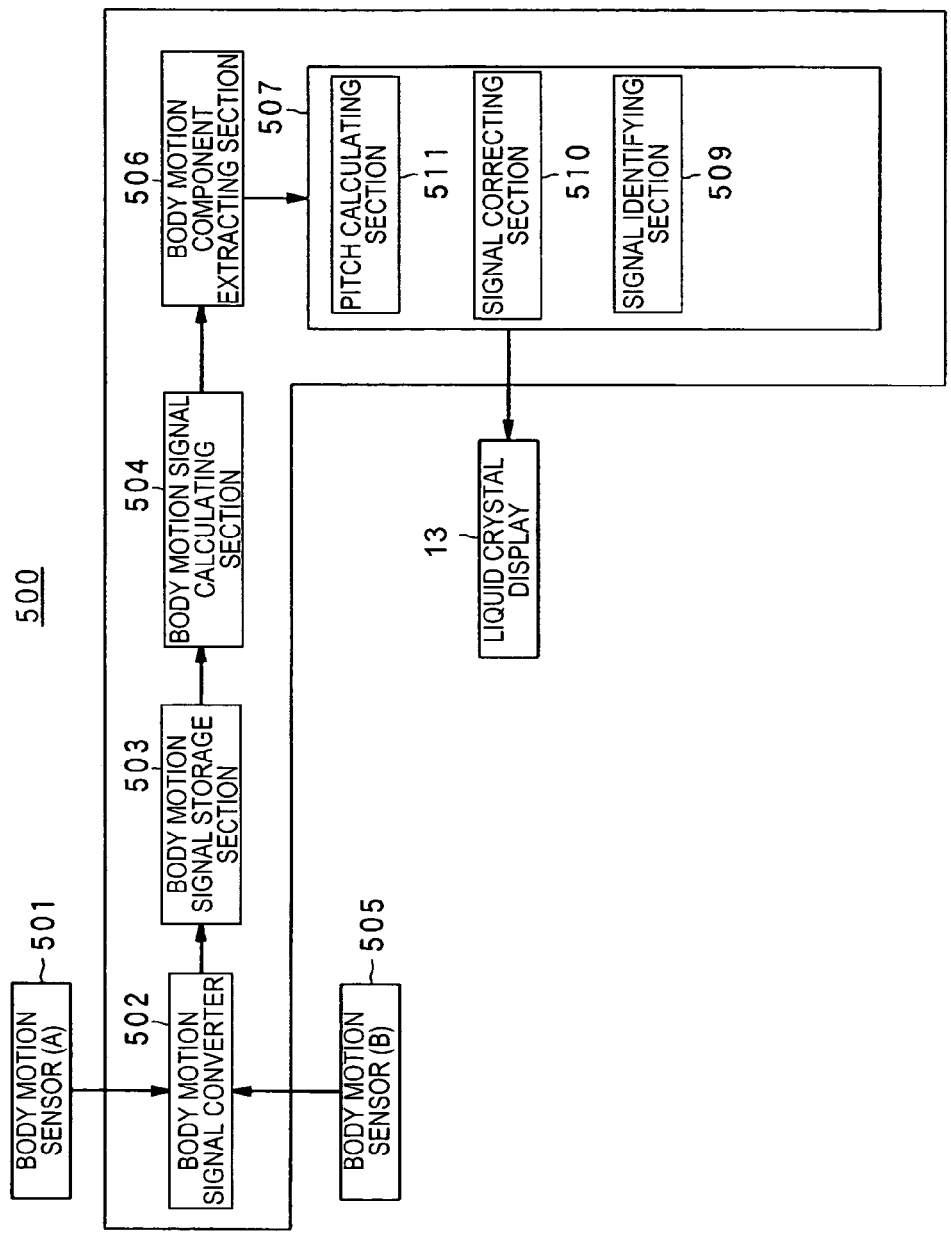
FIG. 24 is a schematic structural block diagram of a pitch detection device comprising a body motion detection device in accordance with a second embodiment of the present invention.
Figure 25:
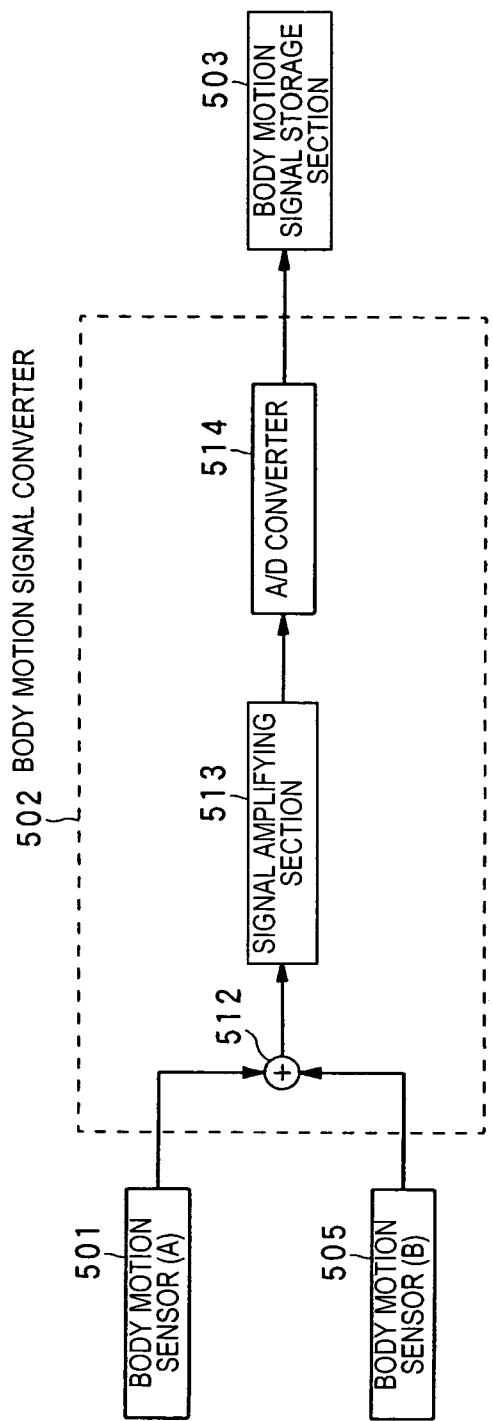
FIG. 25 is a schematic structural block diagram of a body motion signal converter of the body motion detection device in accordance with the second embodiment of the present invention.

Referring now to FIGS. 24 and 25, the second embodiment of the present invention is described. The second embodiment of the present invention simplifies the sequence of the frequency analysis process (FFT) for each of the first and second body motion sensors in the above-mentioned first embodiment by performing frequency analysis after combining the output signals from the first and second body motion sensors. Therefore, the second embodiment has basically an identical configuration as the first embodiment, except that a pitch detection device 500 is used instead of the pitch detection device 400 of the first embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 24 is a schematic structural block diagram of the pitch detection device 500 of the second embodiment. The pitch detection device 500 basically comprises a first body motion sensor 501, a body motion signal converter 502, a body motion signal storage section 503, a body motion signal calculating section 504, a second body motion sensor 505, a body motion signal extracting section 506, a pitch calculating section 507, and a liquid crystal display device 13.

The first body motion sensor 501 and the second body motion sensor 505 are equivalent to the first acceleration sensor A and the second acceleration sensor B, respectively, described above. In other words, the first body motion sensor 501 is preferably oriented so as to have the direction of sensitivity in a direction substantially perpendicular to the axial direction of the arm. Also, the second body motion sensor 505 is preferably oriented such that the direction of a straight line that connects the shoulder joint and the wrist is considered to be the axial direction when the angle formed by the upper arm and the forearm is about 90°, and the direction of sensitivity is set in a direction substantially perpendicular to this axial direction.

FIG. 25 shows a schematic structural block diagram of a body motion signal converter of the second embodiment.

The body motion signal converter 502 basically has a signal combining section 512, a signal amplifying section 513, and an A/D converter 514.

The signal combining section 512 is configured to add and combine the output signals from the first body motion sensor 501 and the second body motion sensor 505, and output the result as a combined body motion signal (integrated body motion signal) to the signal amplifying section 513.

The signal amplifying section 513 is configured to perform an amplification process to bring the signal level of the combined output signal from the first body motion sensor 501 and the second body motion sensor 505 to a specific level or greater, and output the result to the A/D converter 514.

The A/D converter 514 is configured to perform analog/digital conversion on the combined body motion signal whose inputted signal level is amplified to at a specific level or higher, and output the result as body motion signal data to the body motion signal storage section 503.

According to the second embodiment, the body motion signal calculating section 504 is configured to perform frequency analysis (for example, FFT) on the combined body motion signals for the first body motion sensor 501 and the second body motion sensor 505. Therefore, it is possible to perform less of the frequency analysis process comparing to the first embodiment. Thus, it is possible to reduce calculation time, and consequently to reduce power consumption.

The above-mentioned description of the second embodiment includes a configuration wherein the signal combining section 512 is provided individually, but a configuration is also possible wherein the output terminals of the first body motion sensor 501 and the second body motion sensor 505 are connected electrically.

Third Embodiment

Referring now to FIGS. 26–29, the third embodiment of the present invention is explained. The third embodiment of the present invention is configured to combine the output signals of the first and second body motion sensors in the same manner as in the second embodiment. In addition, the third embodiment involves varying the amplification factor in the process of amplifying the two output signals to prevent one output signal from being obscured by the other output signal prior to combining the outputs of the first and second body motion sensors. Furthermore, this embodiment involves using the same amplitude range for the output signals of the first and second body motion sensors. Thus, the third embodiment has basically an identical configuration with the second embodiment, except that the body motion signal converter 502 of the second embodiment is replaced with the body motion signal converter 550 of the third embodiment. In view of the similarity between the first, second and third embodiments, the parts of the third embodiment that are identical to the parts of the first and second embodiments will be given the same reference numerals as the parts of the first and second embodiments. Moreover, the descriptions of the parts of the third embodiment that are identical to the parts of the first and second embodiments may be omitted for the sake of brevity.

Figure 26:
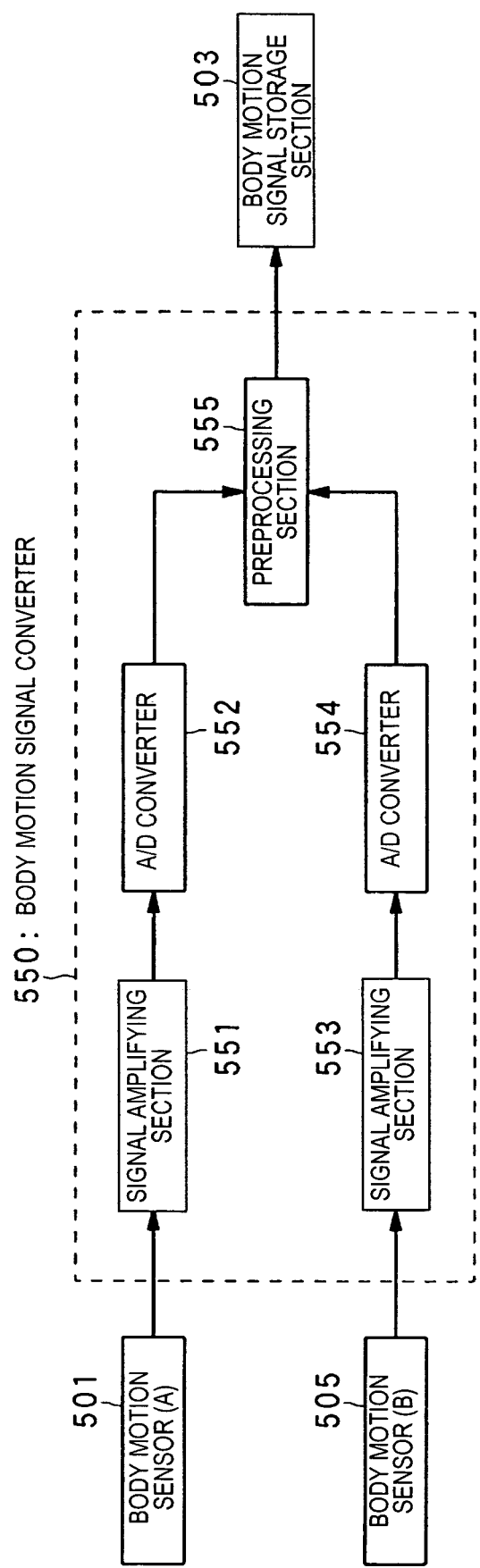
FIG. 26 is a schematic structural block diagram of a body motion signal converter of a body motion detection device in accordance with a third embodiment of the present invention.

FIG. 26 is a schematic structural block diagram of the body motion signal converter 550 of the third embodiment. The body motion signal converter 550 is used instead of the body motion signal converter 502 of the pitch detection device 500 in the second embodiment. The body motion signal converter 550 basically comprises a first signal amplifying section 551, a first A/D converter 552, a second signal amplifying section 553, a second A/D converter 554, and a preprocessing section 555.

The first signal amplifying section 551 is configured to amplify the output signal from the first body motion sensor 501 at a specific factor and output the result as a first amplified signal to the first A/D converter 552.

The first A/D converter 552 is configured to perform analog/digital conversion on the first amplified signal and output the result as first body motion signal data to the preprocessing section 555.

The second signal amplifying section 553 is configured to amplify the output signal from the second body motion sensor 505 at a specific factor and output the result as a second amplified signal to the second A/D converter 554.

The second A/D converter 554 is configured to perform analog/digital conversion on the second amplified signal and output the result as second body motion signal data to the preprocessing section 555.

The preprocessing section 555 is configured to perform a process to match the maximum amplitudes of the first and second body motion signals. More specifically, the preprocessing section 555 is configured to match the maximum amplitudes so that the amplitude range of the first body motion signal corresponding to the first body motion signal data matches the amplitude range of the second body motion signal corresponding to the second body motion signal data within a specific period of time based on the first body motion signal data and the second body motion signal data. Then, the preprocessing section 555 is configured to combine the first and second body motion signal data.

Figure 27:
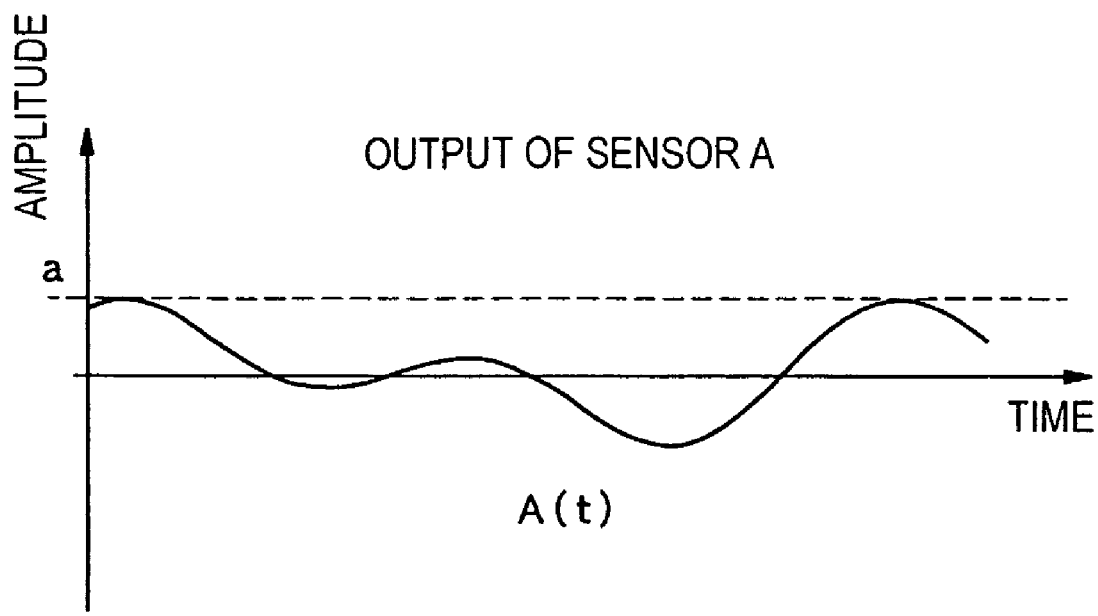
FIG. 27 is an explanatory diagram of the output of a first body motion sensor of the body motion detection device in accordance with the third embodiment of the present invention.
Figure 28:
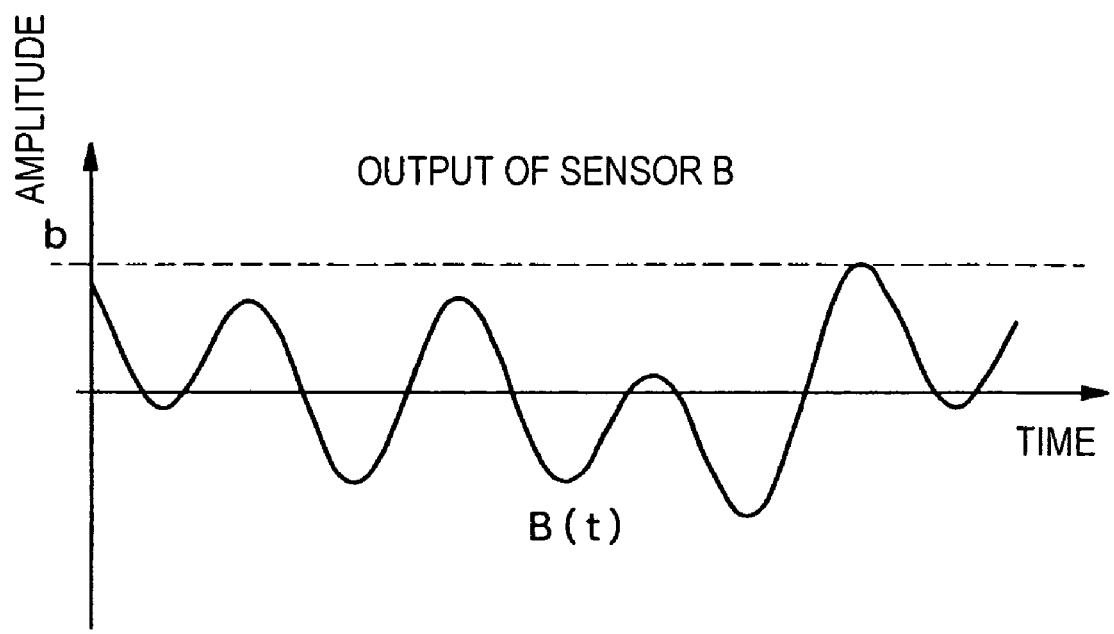
FIG. 28 is an explanatory diagram of the output of a second body motion sensor of the body motion detection device in accordance with the third embodiment of the present invention.
Figure 29:
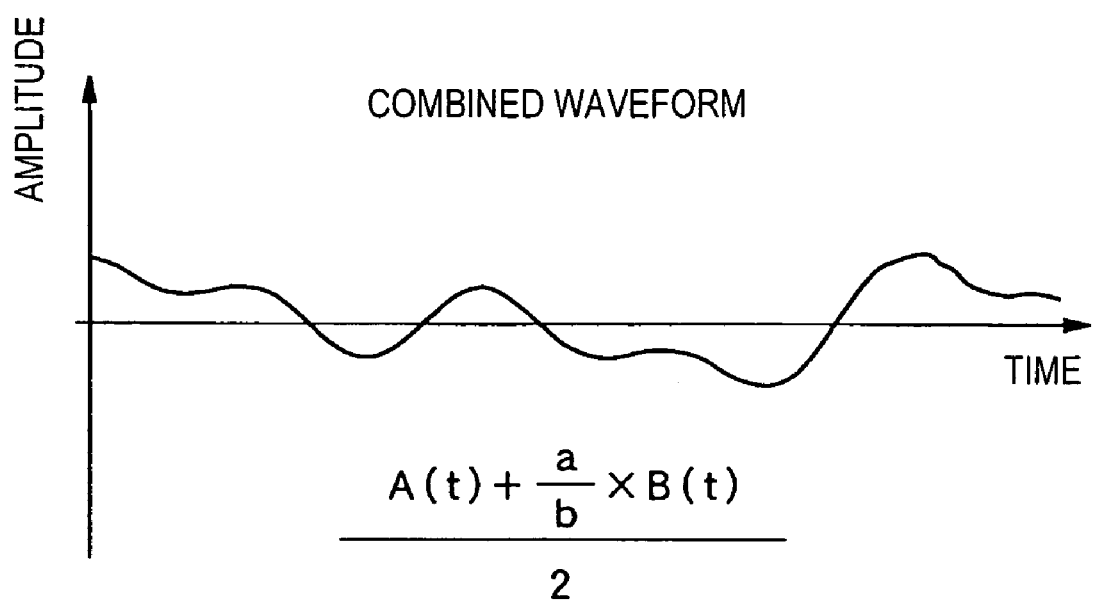
FIG. 29 is an explanatory diagram of a combined waveform in the body motion detection device in accordance with the third embodiment of the present invention.

For example, FIG. 27 illustrates the first body motion signal data A(t) at time t, and FIG. 28 illustrates the second body motion signal data B(t) at time t. The preprocessing section 555 is configured to match between the maximum amplitude of the first and second body motion signals, which are signals corresponding to the first body motion signal data A(t) and the second body motion signal data B(t), respectively. Then the preprocessing section 555 is configured to determine the combined body motion signal data C(t) expressed by the following Equation 2. FIG. 29 illustrates the combined body motion signal data C(t).

$$C(t) = \frac{A(t) + \frac{a}{b} \times B(t)}{d}$$ (Equation 2)

In the above Equation 2, the term d is a variable for limiting the maximum amplitude, and d is preferably equal to 2, as seen in FIG. 29, when the amplitude of the combined body motion signal corresponding to the combined body motion signal data C(t) coincide with the maximum allowable amplitude of the original first body motion signal data A(t) or the second body motion signal data B(t).

Therefore, according to the third embodiment, it is possible to prevent the output signals from the first body motion sensor for detecting the first harmonic during walking, such as walking with light arm movement, from being obscured by the output signals from the second body motion sensor for detecting the first harmonic during running. Thus, the body motion components can be accurately detected during walking. Therefore, it is also possible to accurately detect the pitch.

Fourth Embodiment

Figure 30:
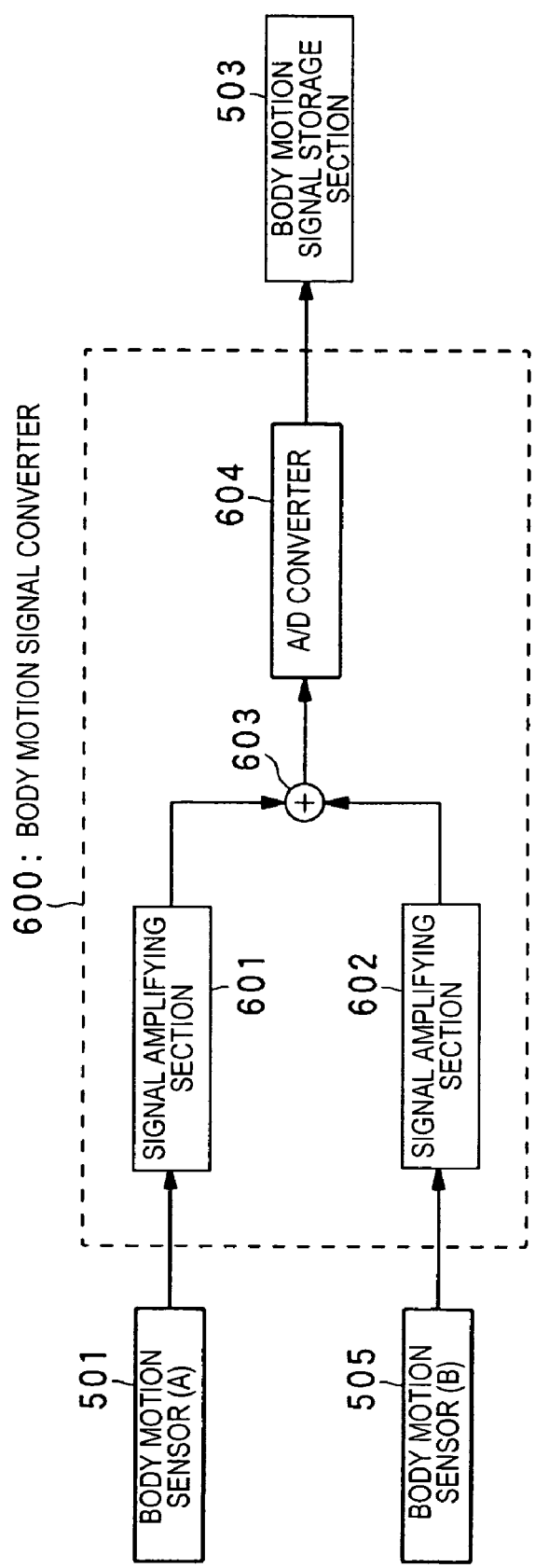
FIG. 30 is a schematic structural block diagram of a body motion signal converter in a body motion detection device in accordance with a fourth embodiment of the present invention.

Referring now to FIG. 30, the fourth embodiment of the present invention is explained. The fourth embodiment is configured to combine the output signals of the first and second body motion sensors in the same manner as in the second embodiment. Additionally, the fourth embodiment involves changing the amplification factor in the process of amplifying the two output signals to prevent an output signal from being obscured by the other output signal prior to combining the output signals from the first and second body motion sensors. Thus, the fourth embodiment has basically an identical configuration with the second embodiment, except that the body motion signal converter 502 of the second embodiment is replaced with the body motion signal converter 600 of the third embodiment. In view of the similarity between the first, second and fourth embodiments, the parts of the fourth embodiment that are identical to the parts of the first and second embodiments will be given the same reference numerals as the parts of the first and second embodiments. Moreover, the descriptions of the parts of the fourth embodiment that are identical to the parts of the first and second embodiments may be omitted for the sake of brevity.

FIG. 30 is a schematic structural block diagram of the body motion signal converter 600 of the fourth embodiment. The body motion signal converter 600 is used instead of the body motion signal converter 502 of the pitch detection device 500 in the second embodiment. The body motion signal converter 600 basically comprises a first signal amplifying section 601, a second motion amplifying section 602, a signal combining section 603, and an A/D converter 604.

The first signal amplifying section 601 is configured to perform an amplifying process to bring the signal level of the output signal from the first body motion sensor 501 to a specific level L1 or greater, and output the result as a first amplified signal to the signal combining section 603. The second motion amplifying section 602 is configured to perform an amplifying process to bring the level of the output signal from the second body motion sensor 505 to a specific level L2 or greater, and output the result as a second amplified signal to the signal combining section 603.

In this case, the first specific level L1 and the second specific level L2 are preferably set to satisfy the relationship L1>L2. This is because during walking with light hand movement, the output signal level of the first body motion sensor 501 decreases below the output signal level of the second body motion sensor 505. Thus, it is possible that the first harmonic components may be obscured by the second harmonic components.

The signal combining section 603 is configured to combine the first amplified signal and second amplified signal and output the result as a combined motion amplified signal to the A/D converter 604.

The A/D converter 604 is configured to perform analog/digital conversion on the inputted combined motion amplified signal and output the result as a body motion signal data to the body motion signal storage section 503.

According to the fourth embodiment, it becomes less likely that noise from the second body motion sensor will have an effect on the output from the first body motion sensor when the output of the first body motion sensor is inherently low, such as when there is little motion (low acceleration) or when motion is unstable. Thus, it is possible to accurately detect the first harmonic regardless of whether the use is walking or running.

Fifth Embodiment

Figure 31:
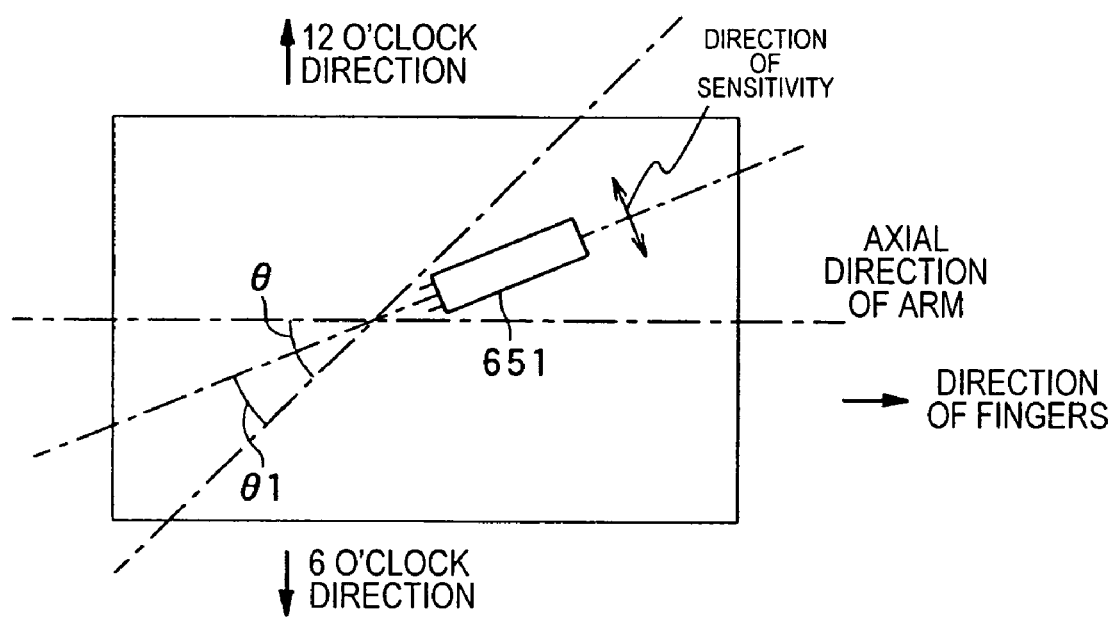
FIG. 31 is an explanatory diagram of the arrangement of a body motion sensor in a body motion detection device in accordance with a fifth embodiment of the present invention.
Figure 32:
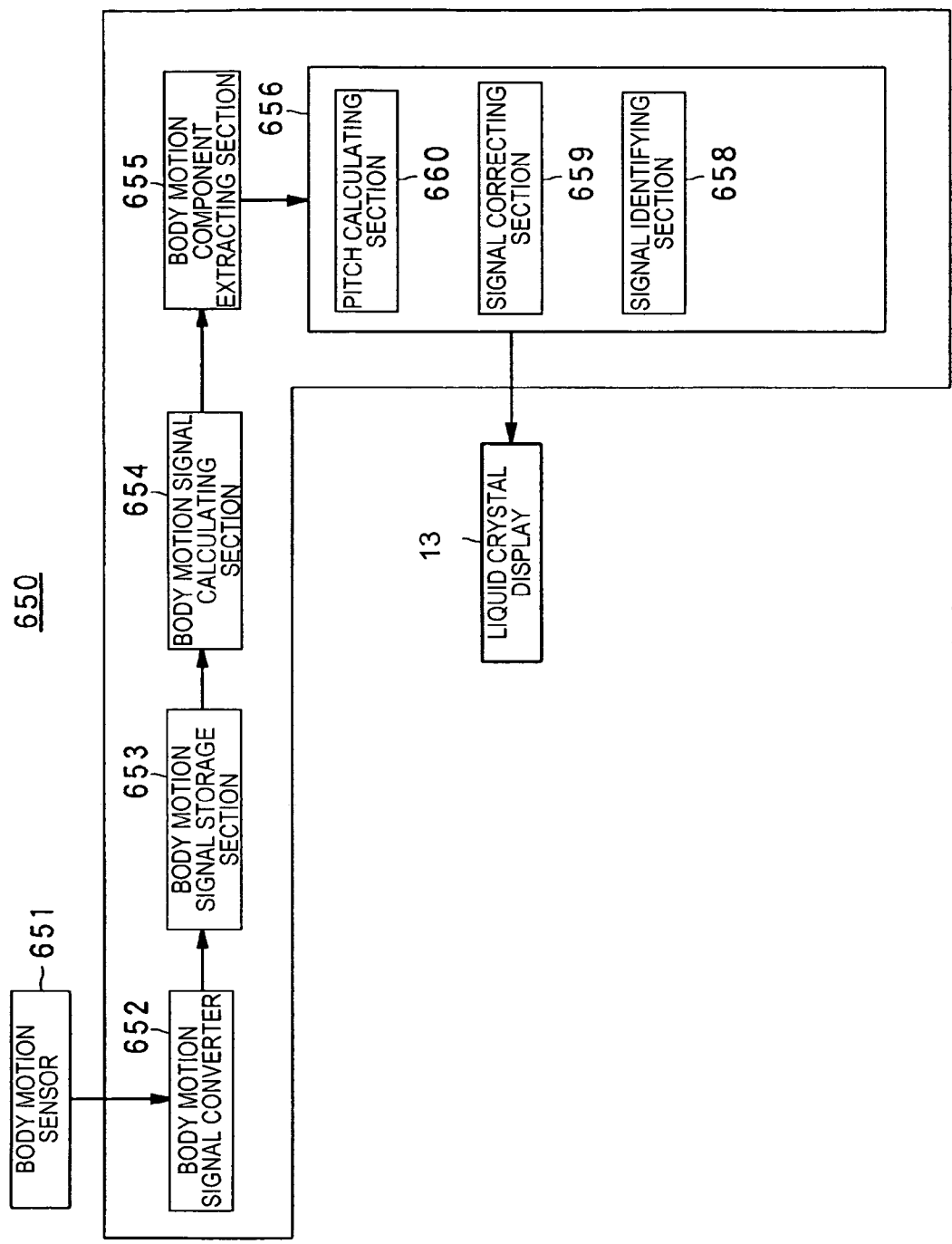
FIG. 32 is a schematic structural block diagram of a pitch detection device comprising the body motion detection device in accordance with the fifth embodiment of the present invention.

Referring now to FIGS. 31 and 32, the fifth embodiment of the present invention is explained. The fifth embodiment involves one acceleration sensor provided as a body motion sensor. Therefore, the main difference between the first embodiment and the fifth embodiment is that while two body motion sensors are provided in the first embodiment, the fifth embodiment is provided with one acceleration sensor that is configured to detect the acceleration originating from arm movement during walking and the acceleration originating from arm movement during running. In other words, the acceleration sensor used in the fifth embodiment is oriented so as to handle the functions of both the first acceleration sensor A and the second acceleration sensor B in the first embodiment. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

As described above, two acceleration sensors are used in the first embodiment, wherein the direction of sensitivity of the first acceleration sensor A is made substantially perpendicular to the axial direction of the arm, as shown in FIG. 2, and the direction of sensitivity is aligned with the direction of 12 o'clock and 6 o'clock in the case of a wristwatch-type device. Also, the second acceleration sensor B is oriented such that the axial direction of the arm and a straight line substantially perpendicular to the direction of sensitivity form an angle θ, as shown in FIG. 2. Therefore, the direction of sensitivity of the second acceleration sensor B is disposed so as to form an angle θ of 50°±15° with the direction of sensitivity of the first acceleration sensor A.

On the other hand, in the fifth embodiment, only one acceleration sensor 651 is provided. FIG. 31 is an explanatory diagram of the arrangement of the acceleration sensor 651 of the fifth embodiment. In this case, the acceleration sensor 651 has the functions of the first acceleration sensor A and the second acceleration sensor B of the first embodiment. As seen in FIG. 31 the acceleration sensor 651 is preferably oriented at a position where an acceleration perpendicular to the direction of a combined vector obtained by combining a first vector directed toward the fingers along the axis of the forearm and a second vector directed away from the shoulder toward the wrist along a straight line between the shoulder and the wrist when the forearm is bent at a specific angle in relation to the upper arm.

Therefore, the acceleration sensor 651 is preferably oriented such that the angle θ1 formed by the direction of the first vector and the direction of the combined vector is about 25±8° (a range between approximately 17° and approximately 33°) when the axial direction of the forearm has an angle of θ1=0°, and the direction of 12 o'clock has an angle of θ1=90°. In other words, the acceleration sensor 651 is preferably oriented to have an sensitivity direction perpendicular to a direction corresponding to a center line of the axes of the first and second acceleration sensors A and B.

FIG. 32 is a schematic structural block diagram of a pitch detection device 650 of the fifth embodiment. The pitch detection device 650 basically comprises a body motion sensor 651, a body motion signal converter 652, a body motion signal storage section 653, a body motion signal calculating section 654, a body motion component extracting section 655, a pitch calculating section 656, and a liquid crystal display device 13.

As mentioned above, the body motion sensor 651 functionally corresponds to the first acceleration sensor A and the second acceleration sensor B described above.

The body motion signal converter 652 comprises a signal amplifying section for amplifying the output signal from the body motion sensor 651, and an A/D converter for performing analog/digital conversion on the output signal from the signal amplifying section and outputting the result as first body motion signal data to the body motion signal storage section 653.

The body motion signal storage section 653 is configured to store the inputted body motion signal data. The body motion signal calculating section 654 is configured to read the body motion signal data from the body motion signal storage section 653, perform frequency analysis by fast Fourier transformation (FFT treatment), and output the data to the body motion component extracting section 655.

The body motion component extracting section 655 is configured to extract the data originating in the body motion components from the inputted data resulting from the frequency analysis, and output the result to the pitch calculating section 656. The pitch calculating section 656 is configured to calculate the pitch based on the inputted the frequency of the body motion components, and display the result on the liquid crystal display device 13.

In the fifth embodiment, the pitch calculating section 656 basically comprises a signal identifying section 658, a signal correcting section 659, and a pitch computing section 660. The signal identifying section 658 is configured to identify the signal with the lowest frequency as a possible first harmonic from among signals whose power has a certain minimum factor in relation to the signal with the maximum power. Then, the signal correcting part 659 is configured to determine and correct the first harmonic based on the frequency of the possible first harmonic signal and the strength of the body motion signal.

The pitch computing section 660 is configured to calculate the pitch based on the first harmonic determined (corrected) by the signal correcting part 659.

According to the fifth embodiment, the body motion signal calculating section 654 is configured to perform frequency analysis (for example, FFT) on the output signal from the body motion sensor 651. The output signal from the body motion sensor 651 is functionally equivalent to a combined body motion signal corresponding to the first acceleration sensor A and the second acceleration sensor B. Thus, the volume of processing for the frequency analysis can be reduced. Accordingly, the calculation time can be shortened and power consumption can therefore be lowered.

Furthermore, the configuration the body motion detection device can be simplified and manufacturing costs can be reduced in comparison with the case in which two acceleration sensors are provided as body motion sensors.

Specific Example of Acceleration Sensor

The above descriptions did not include descriptions of specific examples of an acceleration sensor that can be used as the first body motion sensor (401, 501, or 601), the second body motion sensor (405, 505, or 605) or the body motion sensor (651). Referring now to FIGS. 33–41, specific examples of the acceleration sensor are described. Specifically, a differential capacitor acceleration sensor 700 or a piezoelectric bimorph acceleration sensor 750 is preferably used as the acceleration sensor for each of the sensors. Of course, it will be apparent to those skilled in the art from this disclosure that another type of acceleration sensors can also be utilized as the first body motion sensor (401, 501, or 601), the second body motion sensor (405, 505, or 605), or the body motion sensor (651) in accordance with the present invention.

Differential Capacitor Acceleration Sensor

Figure 33:
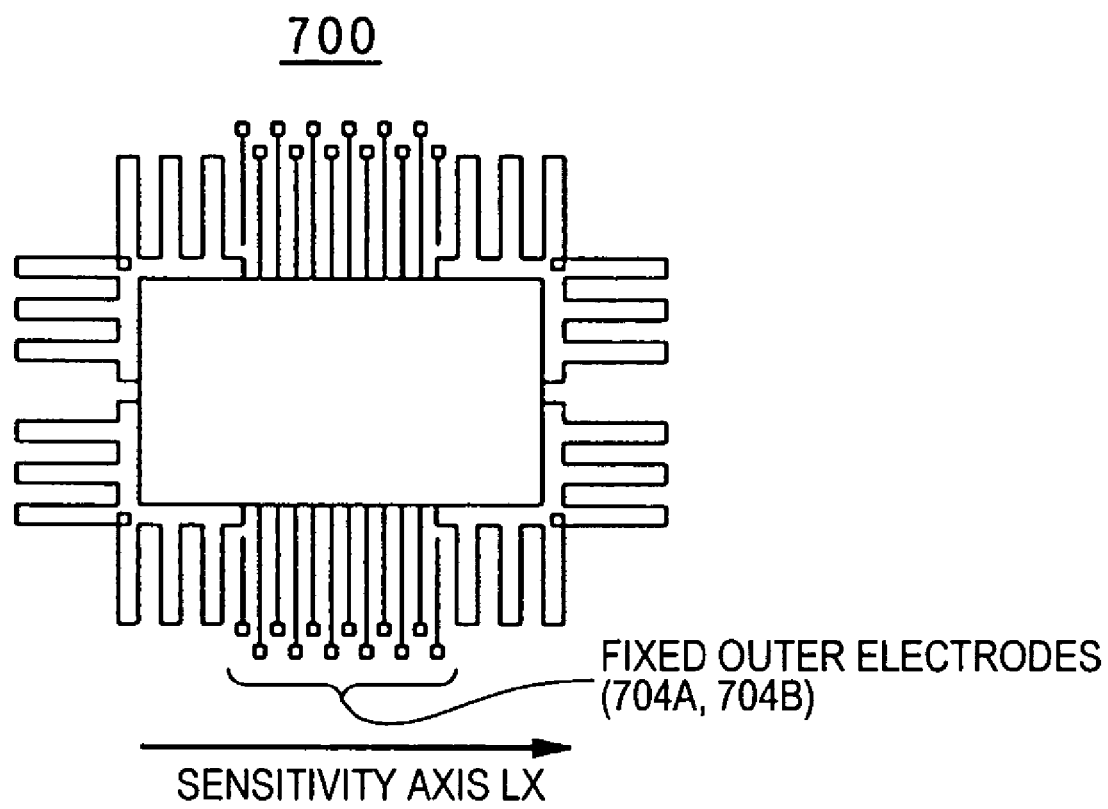
FIG. 33 is a structural schematic view of a differential capacitor acceleration sensor used as the body motion sensor.
Figure 34:
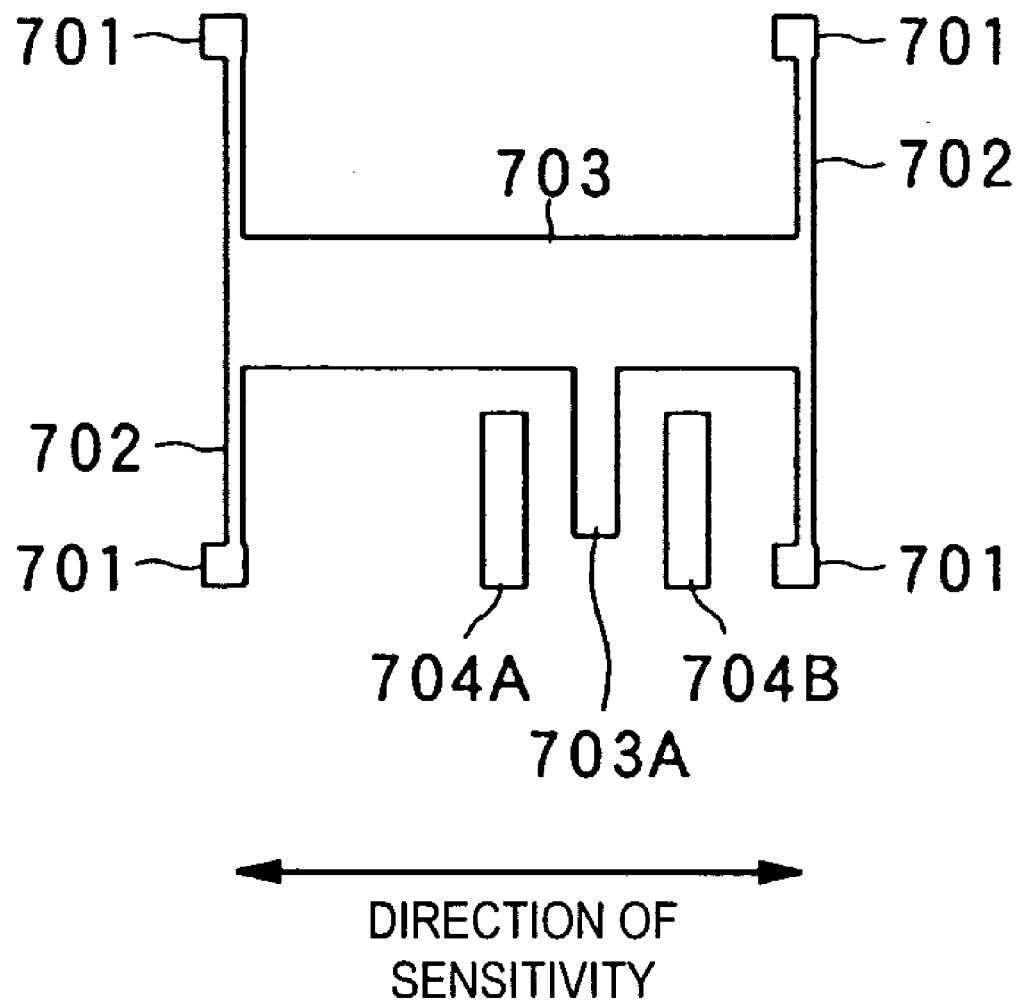
FIG. 34 is a partial enlarged view of the differential capacitor acceleration sensor before acceleration is applied.

FIG. 33 is a structural schematic view of the differential capacitor acceleration sensor 700 used as the acceleration sensor. FIG. 34 is a partial enlarged view of the differential capacitor acceleration sensor before acceleration is applied.

The differential capacitor acceleration sensor 700 is a monoaxial acceleration sensor and has a sensitivity axis LX. The differential capacitor acceleration sensor 700 has a pair of flexible tethers 702 with opposite ends of each tethers 702 being supported on a pair of fixed axes 701. The pair of tethers 702 supports a beam 703 from both sides.

The beam 703 is provided with a cantilevered electrode 703A. The electrode 703A is held at a position at which a pair of fixed outer electrodes 704A and 704B are disposed facing each other, which position is nearly equidistant from the outer electrodes 704A and 704B. As shown in FIG. 33, the direction of extension of the beam 703 is the direction of sensitivity of the differential capacitor acceleration sensor 700. Therefore, the direction of extension of the beam 703 should be made to coincide with the direction of the acceleration to be detected during actual use.

According to the above-mentioned configuration, the electrode 703A and the fixed outer electrodes 704A and 704B all function as capacitors having substantially the same capacity.

Figure 35:
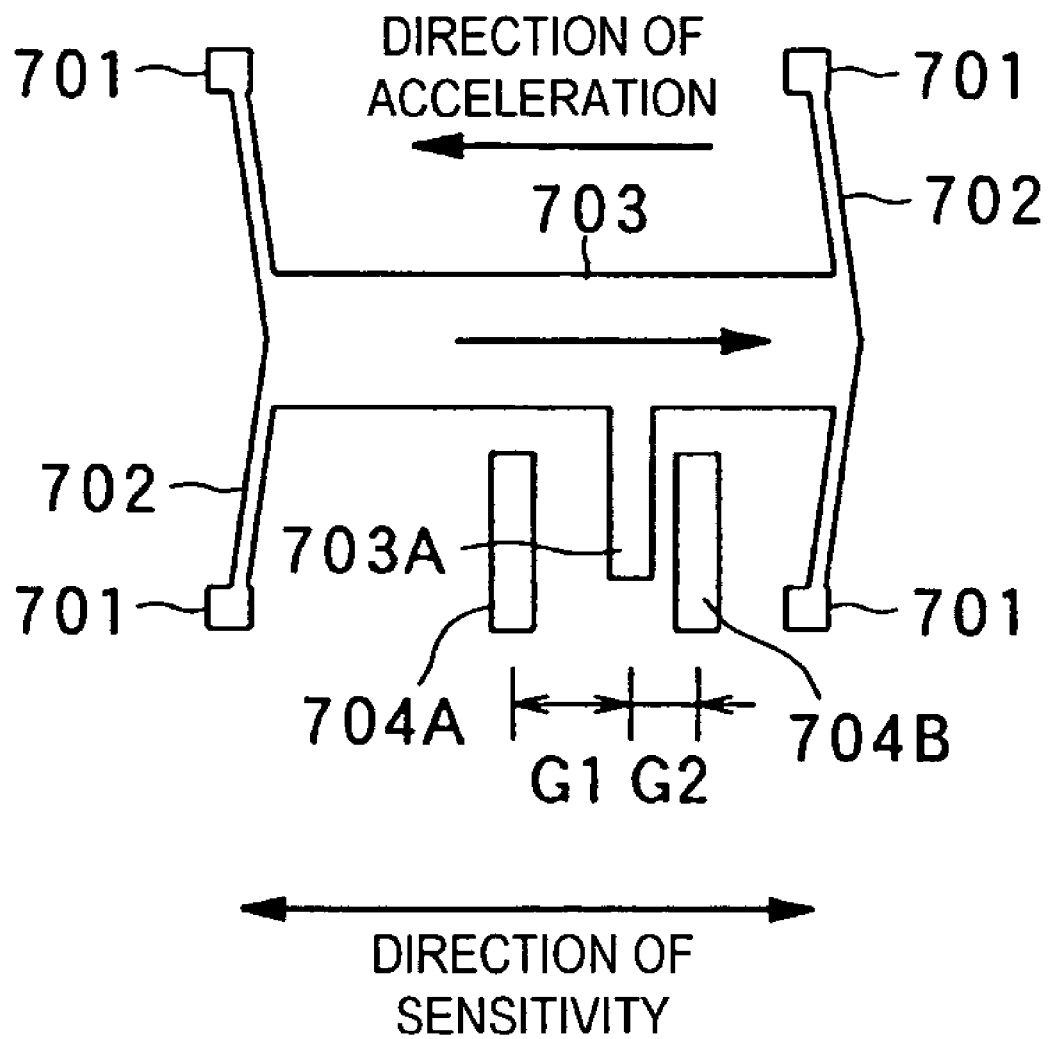
FIG. 35 is a partial enlarged view of the differential capacitor acceleration sensor after acceleration is applied.

FIG. 35 is a partial enlarged view of a differential capacitor acceleration sensor after acceleration is applied. In the state shown in FIG. 34 before the acceleration is applied, the tethers 702 bend when acceleration is applied to the differential capacitor acceleration sensor 700, resulting in the state shown in FIG. 35. As a result, for example, the distance G1 between the electrode 703A and the fixed outer electrode 704A becomes greater than the distance G2 between the electrode 703A and the fixed outer electrode 704B as shown in FIG. 35. Specifically, the capacity of the capacitor composed of the electrode 703A and the fixed outer electrode 704B increases.

Therefore, it is possible to detect the degree of acceleration by measuring the difference in capacity, because the difference in capacity is proportionate to the degree of applied acceleration. In this case, the differential capacitor acceleration sensor 700 is actually used on the ground, and is therefore, affected by gravity (gravitational acceleration=1G). Therefore, a bias voltage is generated in the voltage output of the differential capacitor acceleration sensor 700, and this bias should be corrected externally.

Figure 36:
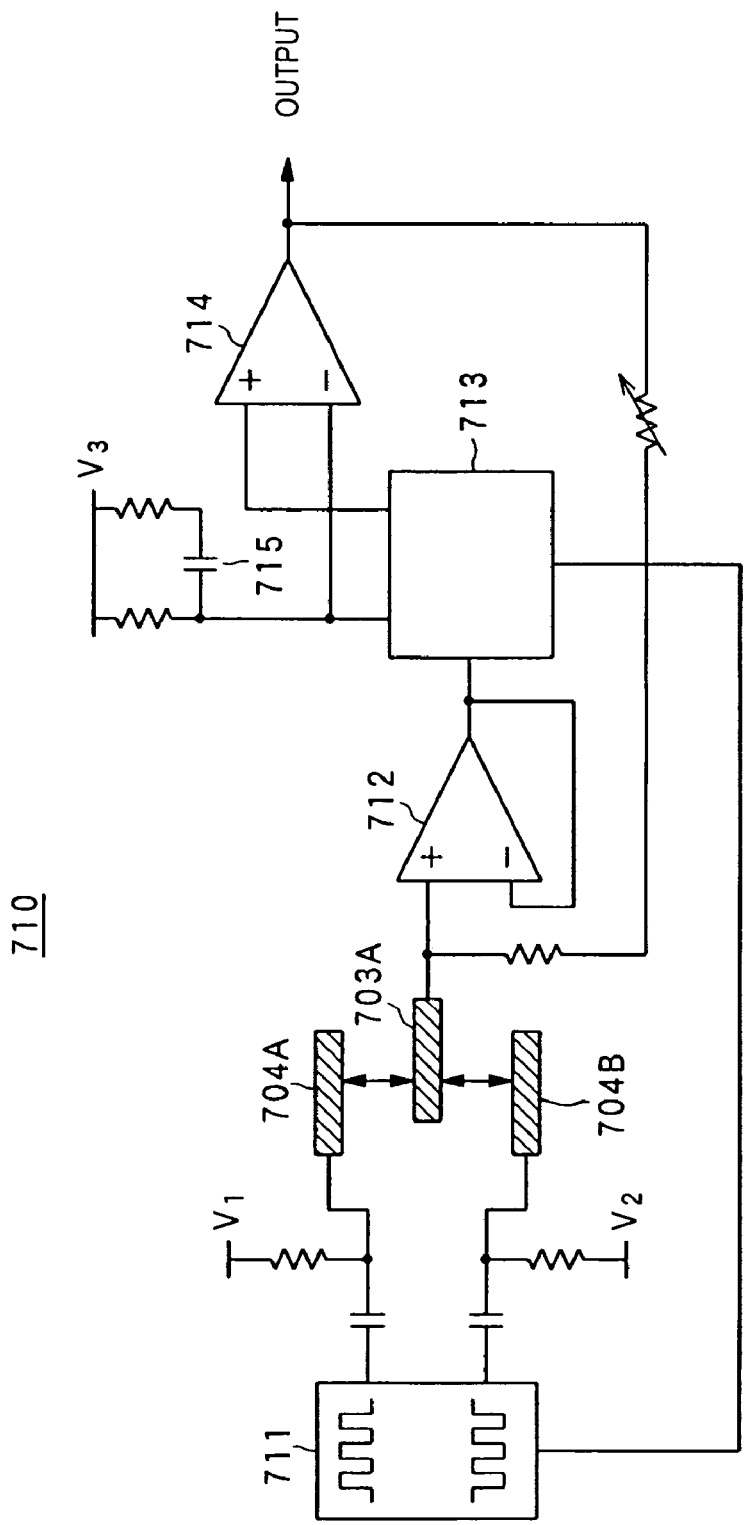
FIG. 36 is a basic circuit structural diagram of a sensor circuit corresponding to the differential capacitor acceleration sensor.
Figure 37:
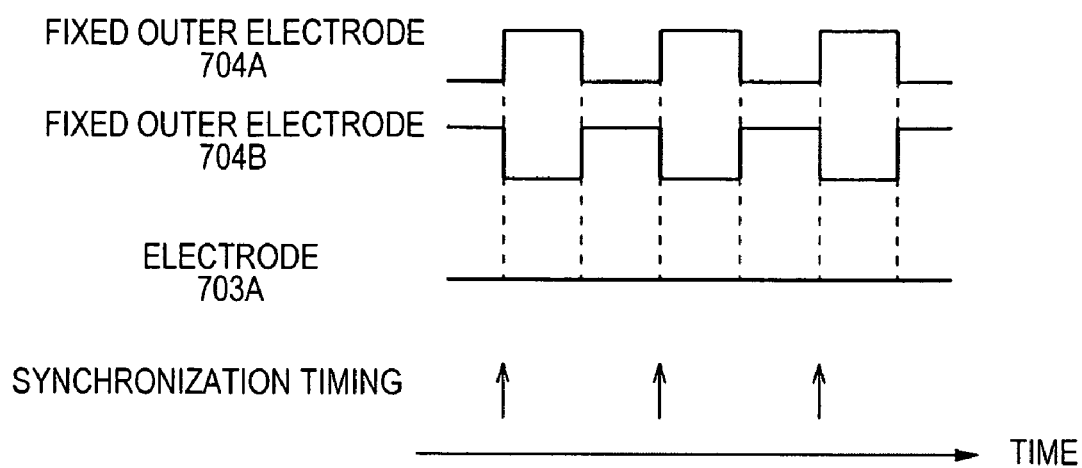
FIG. 37 is a simplified waveform diagram of a case in which acceleration is not applied to the differential capacitor acceleration sensor.
Figure 38:
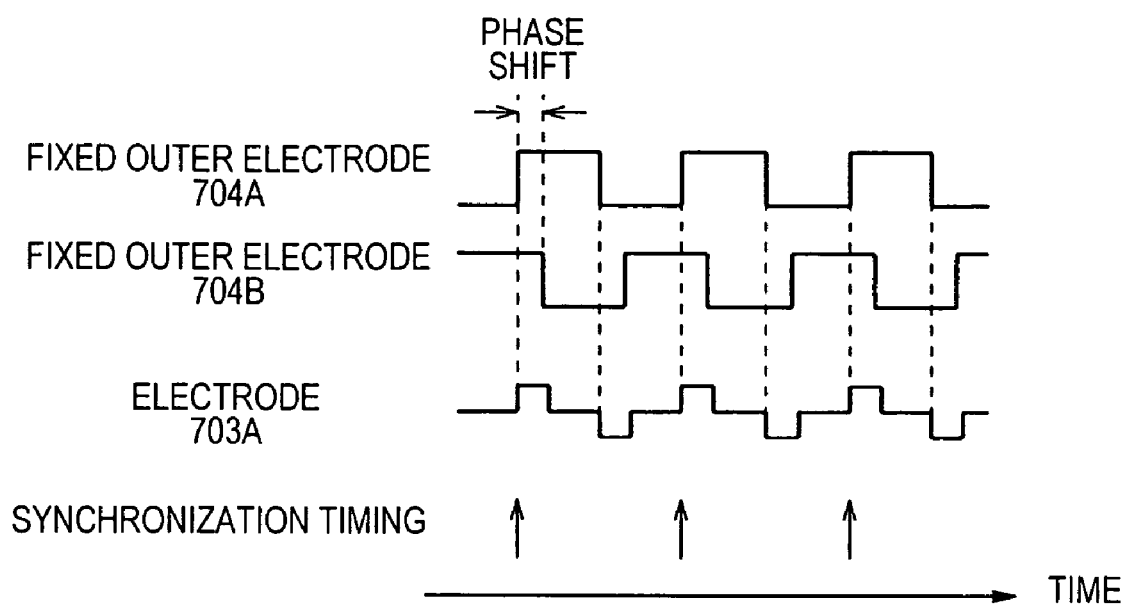
FIG. 38 is a simplified waveform diagram of a case in which acceleration is applied to the differential capacitor acceleration sensor.

FIG. 36 is a basic circuit structural diagram of a sensor circuit 710 corresponding to the differential capacitor acceleration sensor 700. FIG. 37 is a waveform diagram of a case in which acceleration is not applied to the differential capacitor acceleration sensor 700. FIG. 38 is a waveform diagram of a case in which acceleration is applied to the differential capacitor acceleration sensor 700.

In the sensor circuit 710 shown in FIG. 36, an oscillator 711 applies oppositely phased pulse signals to the fixed outer electrodes 704A and 704B of the differential capacitor acceleration sensor 700. When acceleration is not applied as shown in FIG. 34, the capacity of the capacitor composed of the electrode 703A and the fixed outer electrode 704A is the same as the capacity of the capacitor composed of the electrode 703A and the fixed outer electrode 704B because the distance G1 between the electrode 703A and the fixed outer electrode 704A is equal to the distance G2 between the electrode 703A and the fixed outer electrode 704B.

Therefore, as shown in FIG. 37, a waveform of the signals does not show a phase shift in the pulse signals applied to the fixed outer electrodes 704A and 704B. The waveform of the pulse applied to the electrode 703A is cancelled by the opposite phases, and the voltage of the output signals from the electrode 703A becomes constant and is inputted to an operational amplifier 712. On the other hand, when acceleration is applied as shown in FIG. 35, the distance G1 between the electrode 703A and the fixed outer electrode 704A differs from the distance G2 between the electrode 703A and the fixed outer electrode 704B. Thus, the capacity of the capacitor configured from the electrode 703A and the fixed outer electrode 704A differs from the capacity of the capacitor configured from the electrode 703A and the fixed outer electrode 704B.

Therefore, as shown in FIG. 38, waveforms of the signals show a phase shift in the pulse signals applied to the fixed outer electrodes 704A and 704B. The pulses applied to the electrode 703A are added together, and the output signal from the electrode 703A is provided with a voltage value corresponding to the applied acceleration and is inputted to the operational amplifier 712. Therefore, a demodulator 713 takes in the output signal from the operational amplifier 712 in synchronization with the pulse signals applied to the fixed outer electrodes 704A and 704B. The demodulator 713 outputs a signal with positive voltage to an output operational amplifier 714 as the demodulated signal if the direction of acceleration is the forward direction, or outputs a signal with negative voltage as the demodulated signal if the direction of acceleration is the reverse direction. The unnecessary signals are preferably removed by an external capacitor 715 and the demodulated signals are outputted.

As a result, the output operational amplifier 714 outputs an acceleration detection signal whose voltage corresponds to the detected acceleration.

Piezoelectric Bimorph Acceleration Sensor

Figure 39:
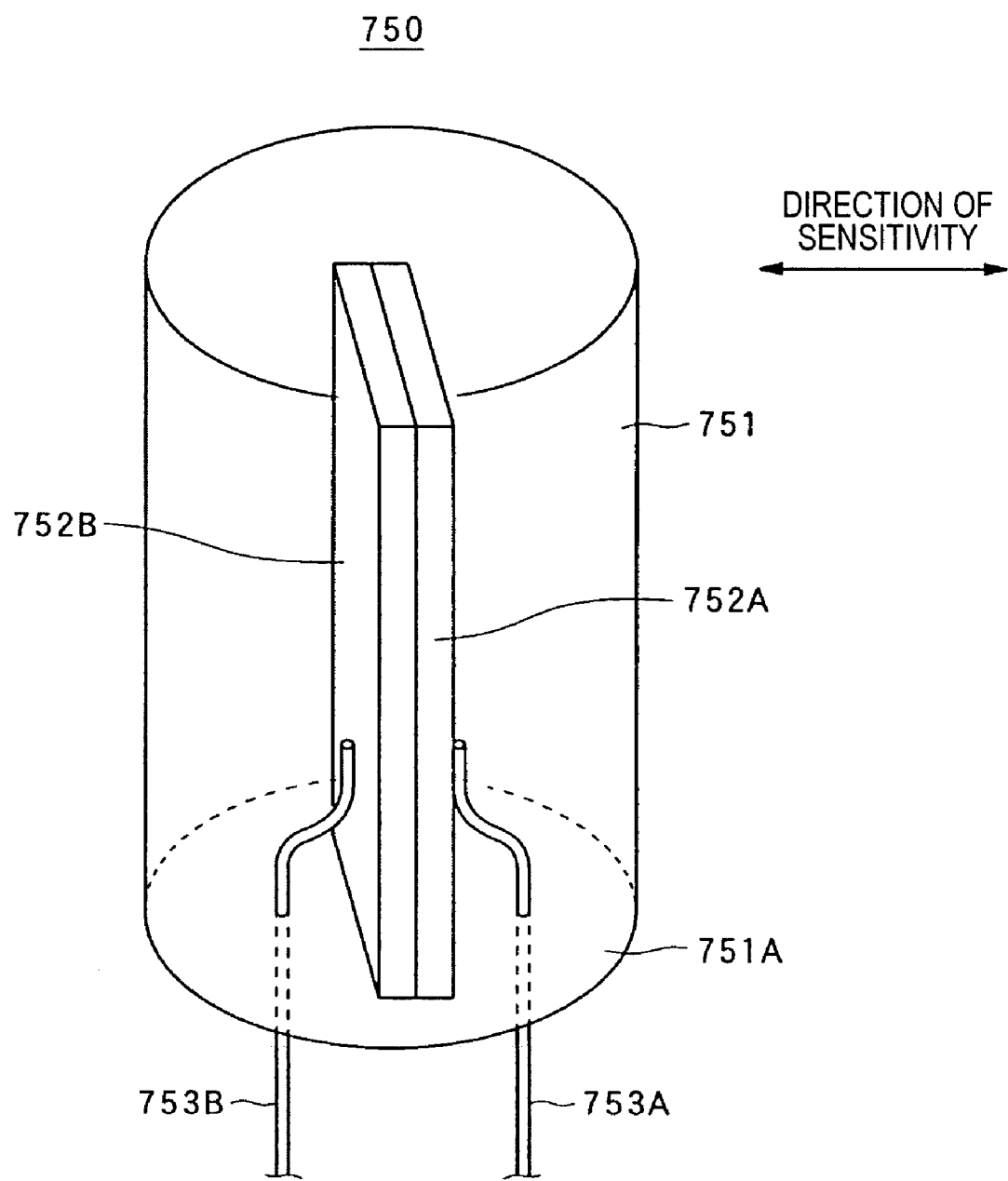
FIG. 39 is a structural schematic view of a case in which acceleration is not applied to a piezoelectric bimorph acceleration sensor used as the body motion sensor.

FIG. 39 is a structural schematic view of a piezoelectric bimorph acceleration sensor 750 used as an acceleration sensor. FIG. 39 illustrates a state in which acceleration is not applied to the piezoelectric bimorph acceleration sensor 750.

As shown in the diagram, the piezoelectric bimorph acceleration sensor 750 has two rectangular plate-shaped piezoelectric elements 752A and 752B that are stacked together in the middle of a case 751 and are fixedly mounted upright on the bottom surface 751A of the case 751. Lead wires 753A and 753B are electrically connected to the piezoelectric elements 752A and 752B, and these lead wires 753A and 753B run to the outside and function as external connecting terminals.

Figure 40:
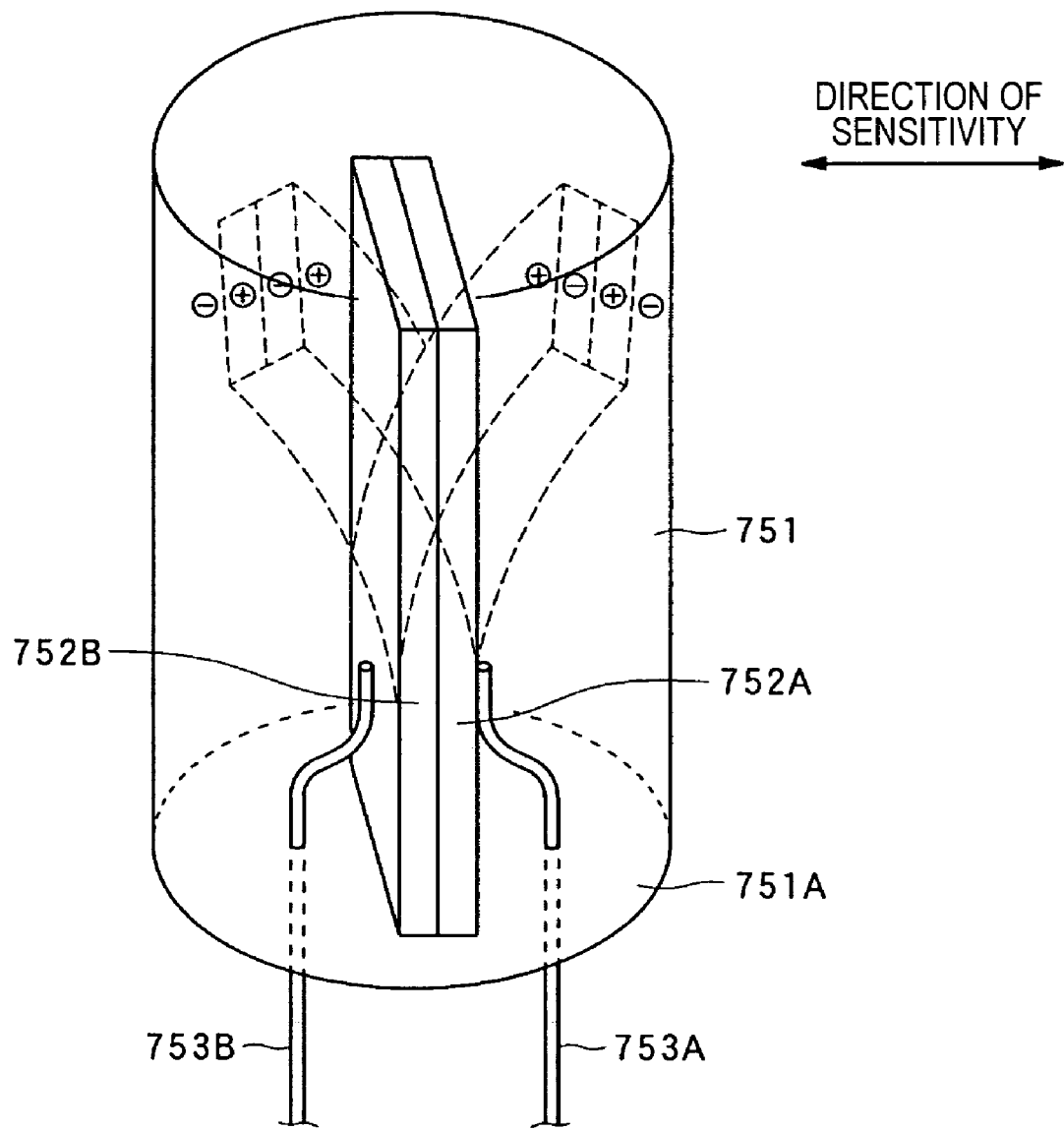
FIG. 40 is a structural schematic view of a case in which acceleration is applied to the piezoelectric bimorph acceleration sensor.

FIG. 40 is a structural schematic view of the piezoelectric bimorph acceleration sensor 750 illustrating a state in which acceleration is applied to the piezoelectric bimorph acceleration sensor 750. The direction of sensitivity of the piezoelectric bimorph acceleration sensor 750 in the diagram is the right and left direction of FIG. 40, i.e., the direction of the plate thickness of the piezoelectric elements 752A and 752B. Therefore, the direction of sensitivity must be made to coincide with the direction of the acceleration to be detected during actual use.

When acceleration is applied, the piezoelectric elements 752A and 752B become bent, and an electric charge is generated on the surface of the piezoelectric elements 752A and 752B due to the piezoelectric effect. The electric charge thus generated is outputted via the lead wires 753A and 753B. The + and − symbols in FIG. 40 show an example of the electrical charges thus generated.

Figure 41:
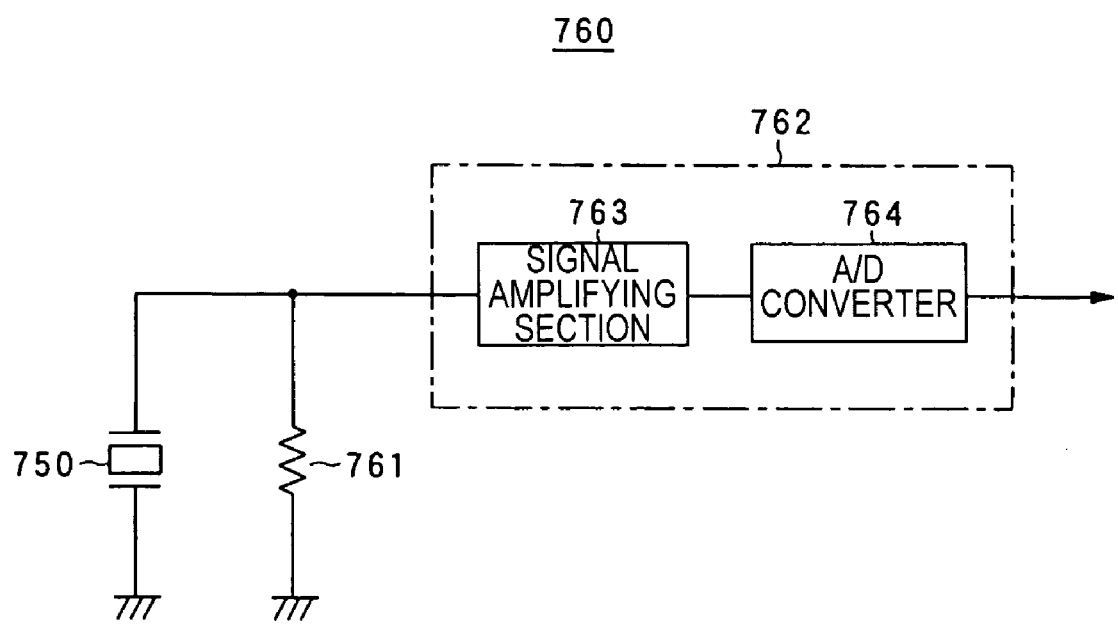
FIG. 41 is a basic circuit structural diagram of a sensor circuit corresponding to the piezoelectric bimorph acceleration sensor.
Figure 42:
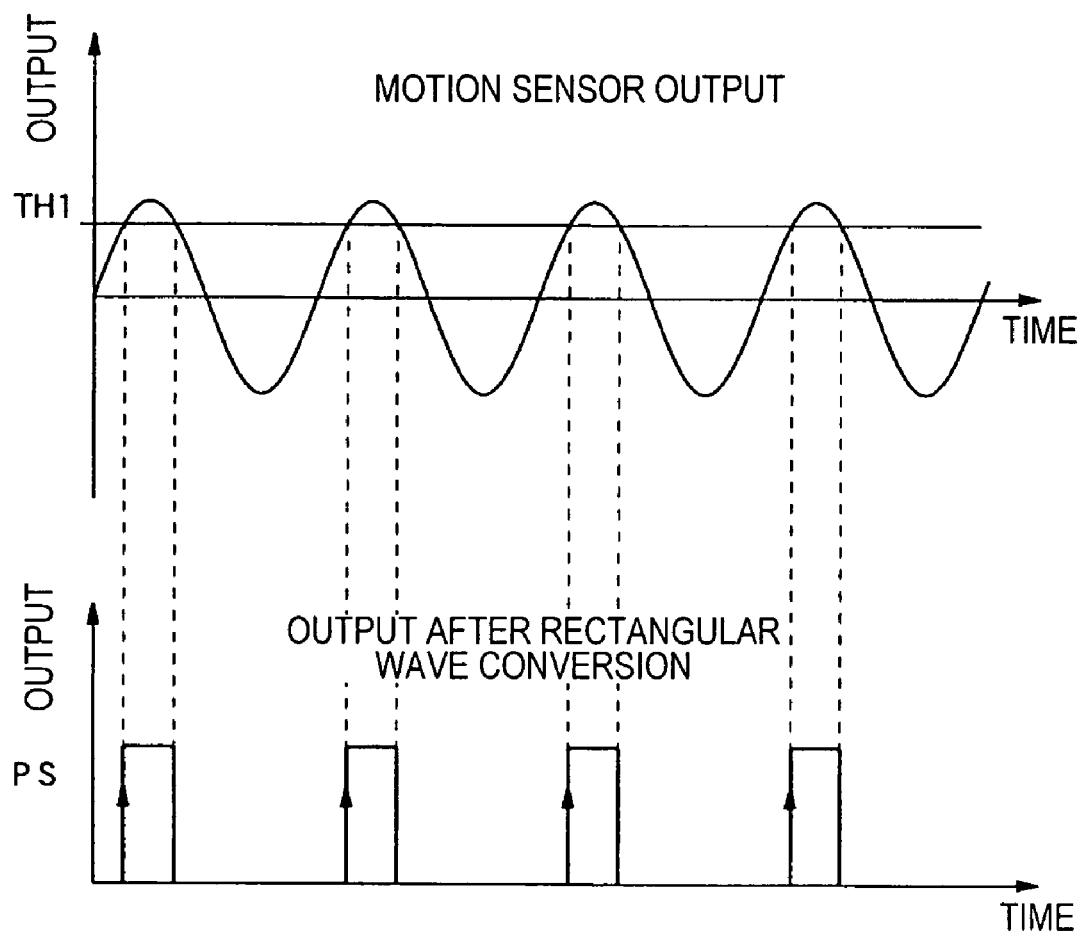
FIG. 42 is a simplified waveform diagram of the body motion signal and the body motion signals after it has have been converted to a rectangular waveform in a conventional pitch meter.
Figure 43:
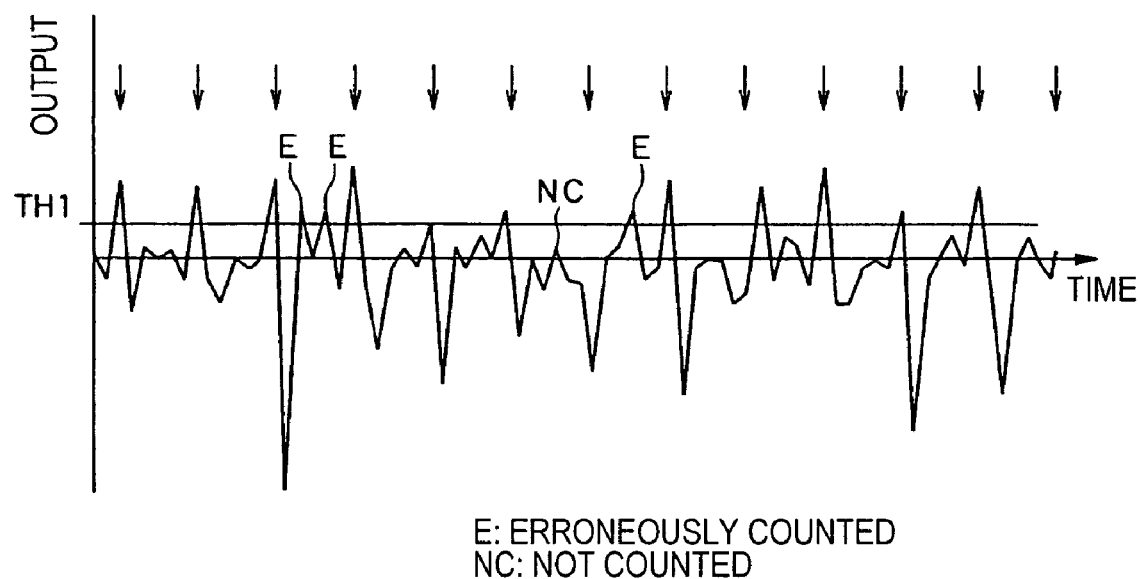
FIG. 43 is a simplified diagram of output signals in the conventional pitch meter describing the problems with the conventional pitch meter.

FIG. 41 is a basic circuit structural diagram of a sensor circuit 760 corresponding to the piezoelectric bimorph acceleration sensor 750. The sensor circuit 760 basically includes a resistance 761 connected in parallel to the piezoelectric bimorph acceleration sensor 750, and a body motion signal converter 762 connected to the resistance 761. The electric charge generated by the piezoelectric bimorph acceleration sensor 750 is converted to voltage by the resistance 761. This voltage is applied to a signal amplifying section 763 of the body motion signal converter 762, and the signal amplifying section 763 removes unnecessary noise components and bias components with a low-pass filter or a high-pass filter or the like (not shown), amplifies the resulting signal, and outputs the amplified signal as a sensor-amplified output signal to an A/D converter 764. The A/D converter 764 performs analog/digital conversion on the sensor-amplified output signal and outputs an acceleration detection signal whose value corresponds to the degree of acceleration detected by the piezoelectric bimorph acceleration sensor 750.

The above description was given with reference to a case wherein a control program was stored in advance in the wristwatch-type information device, but another possibility is a configuration wherein the control program is stored in advance on various magnetic disks, optical disks, memory cards, and other such storage media, and the wristwatch-type information device reads the program from these storage media and installs it. Another possibility is a configuration wherein the wristwatch-type information device is provided with a communication interface, which downloads the control program via the Internet, LAN, or another such network and installs it.

The term "configured" as used herein to describe a component, section or part of a device includes hardware and/or software that is constructed and/or programmed to carry out the desired function.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" nd "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-61781 and 2003-357980. The entire disclosures of Japanese Patent Application Nos. 2003-61781 and 2003-357980 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A body motion detection device configured to be attached to a forearm of a human body to detect a body motion of the human body, comprising:
    a body motion sensor unit configured and arranged to detect an acceleration caused substantially by a movement of the forearm during walking and an acceleration caused substantially by a movement of the forearm during running to output at least one body motion signal, said body motion sensor unit including
        a first acceleration sensor configured and arranged to detect said acceleration caused by the movement of the forearm during walking and output a first body motion signal,
        a second acceleration sensor configured and arranged to detect said acceleration caused by the movement of the forearm during running and output a second body motion signal; and
    a body motion component extracting section configured and arranged to extract a body motion component from said at least one body motion signal, said body motion component extracting section configured and arranged to extract said body motion component based on said first and second body motion signals, said body motion component being configured to be utilized to determine pitch to be used to calculate the number of a user's steps to be displayed to said user or to be stored.

2. The body motion detection device as recited in claim 1, wherein
    said first acceleration sensor is configured and arranged to detect an acceleration in a direction that is substantially perpendicular to an axis of the forearm extending from an elbow toward a hand, and
    said second acceleration sensor is configured and arranged to detect an acceleration in a direction that is substantially perpendicular to a straight line formed between a shoulder and a wrist of the human body when the entire arm is moved within an arc defined by the movement of an upper arm of the human body while the forearm is bent with respect to the upper arm.

3. The body motion detection device as recited in claim 1, wherein said first acceleration sensor has an acceleration sensitivity direction that is substantially perpendicular to an axis of the forearm extending from an elbow toward a hand, and said second acceleration sensor configured and arranged to detect an acceleration where said second acceleration has a sensor direction that makes a prescribed angle set in a range between approximately 35° and approximately 65° from a sensor direction of said first acceleration sensor.

4. The body motion detection device as recited in claim 1, wherein said first acceleration sensor has an acceleration sensitivity direction that is substantially perpendicular to an axis of the forearm extending from an elbow toward a hand, and the second acceleration sensor is disposed such that an angle θ satisfies $\theta = \tan^{-1}(X/Y)$, where X is equal to the approximate length from the shoulder joint to the elbow joint, Y is equal to the approximate length from the elbow joint to the wrist, and θ is defined by an angle made by a sensor direction of said first acceleration sensor and a sensor direction of said second acceleration sensor when the angle between X and Y is substantially 90.

5. The body motion detection device as recited in claim 1, wherein, said body motion component extracting section includes a first frequency analysis section configured and arranged to execute an frequency analysis of said first body motion signal, a second frequency analysis section configured and arranged to execute an frequency analysis of said second body motion signal, and a reference wave determining section configured and arranged to determine a reference wave to extract said body motion component based on results of the frequency analysis from said first and second frequency analysis sections.

6. The body motion detection device as recited in claim 1, wherein said body motion component extracting section includes a combining section configured and arranged to output an integrated body motion signal by integrating said first and second body motion signals, a frequency analysis section configured and arranged to execute an frequency analysis of said integrated body motion signal, and a reference wave determining section configured and arranged to determine a reference wave to extract said body motion component based on a result of the frequency analysis from said frequency analysis section.

7. The body motion detection device as recited in claim 1, wherein said body motion component extracting section includes an amplifying section configured and arranged to output an amplified first body motion signal by amplifying said first body motion signal by a prescribed amplification rate, a first frequency analysis section configured and arranged to execute a frequency analysis of said amplified first body motion signal, a second frequency analysis section configured and arranged to execute a frequency analysis of said second body motion signal, and a reference wave determining section configured and arranged to determine a reference wave to extract said body motion component based on results of the frequency analysis from said first and second frequency analysis sections.

8. The body motion detection device as recited in claim 1, wherein said body motion component extracting section includes a preprocessing calculation section configured and arranged to output an integrated body motion signal by integrating said first and second body motion signals after preprocessing said first and second body motion signals such that maximum amplitudes of said first and second body motion signals become substantially equal to each other, a frequency analysis section configured and arranged to execute a frequency analysis of said integrated body motion signal, and a reference wave determining section configured and arranged to determine a reference wave to extract said body motion component based on a result of the frequency analysis from said frequency analysis section.

9. A pitch meter comprising:

a body motion detection device configured to be attached to a forearm of a human body to detect a body motion of the human body, said body motion detection device including a first acceleration sensor configured and arranged to detect said acceleration caused by a forearm movement of the forearm during walking and output a first body motion signal, a second acceleration sensor configured and arranged to detect said acceleration caused by the forearm movement during running and output a second body motion signal, and a body motion component extracting section including a first frequency analysis section configured and arranged to execute an frequency analysis of said first body motion signal, a second frequency analysis section configured and arranged to execute an frequency analysis of said second body motion signal, and a reference wave determining section configured and arranged to determine a reference wave for extracting said body motion component based on results of the frequency analysis from said first and second frequency analysis sections, said reference wave being a signal that is on the furthest low frequency side among signals having a prescribed ratio of power to a highest power signal in the results of the frequency analysis; and a pitch calculation section configured and arranged to calculate a pitch of the body motion of the human body based on said reference wave, said pitch to be used to calculate the number of a user's steps to be displayed to said user or to be stored.

10. A step counter, comprising:
a body motion detection device configured to be attached to a forearm of a human body to detect a body motion of the human body, said body motion detection device including
   a first acceleration sensor configured and arranged to detect said acceleration caused by a forearm movement of the forearm during walking and output a first body motion signal,
   a second acceleration sensor configured and arranged to detect said acceleration caused by the forearm movement during running and output a second body motion signal, and
   a body motion component extracting section including
      a first frequency analysis section configured and arranged to execute an frequency analysis of said first body motion signal,
      a second frequency analysis section configured and arranged to execute an frequency analysis of said second body motion signal, and
      a reference wave determining section configured and arranged to determine a reference wave for extracting said body motion component based on results of the frequency analysis from said first and second frequency analysis sections, said reference wave being a signal that is on the furthest low frequency side among signals having a prescribed ratio of power to a highest power signal in the results of the frequency analysis;
a pitch calculation section configured and arranged to calculate a pitch of the body motion of the human body based on said reference wave; and
a step count calculating section configured and arranged to calculate step counts from said pitch and to display or to store said step counts.

11. A wrist watch type information processing device comprising:
a main body configured and arranged to be placed on a forearm of a human body including a body motion detection device to detect a body motion of the human body, said body motion detection device including
   a first acceleration sensor configured and arranged to detect said acceleration caused by a forearm movement of the forearm during walking and output a first body motion signal,
   a second acceleration sensor configured and arranged to detect said acceleration caused by the forearm movement during running and output a second body motion signal, and
   a body motion component extracting section including
      a first frequency analysis section configured and arranged to execute an frequency analysis of said first body motion signal,
      a second frequency analysis section configured and arranged to execute an frequency analysis of said second body motion signal, and
      a reference wave determining section configured and arranged to determine a reference wave for extracting said body motion component based on results of the frequency analysis from said first and second frequency analysis sections, said reference wave being a signal that is on the furthest low frequency side among signals having a prescribed ratio of power to a highest power signal in the results of the frequency analysis;
a pitch calculation section configured and arranged to calculate a pitch of the body motion of the human body based on said reference wave, said pitch to be used to calculate the number of a user's steps to be displayed to said user or to be stored; and
a wrist band member coupled to said main body configured and arranged to removably place said main body on a wrist of the human body.

12. A method of detecting a body motion of a human body, comprising:
performing a body motion signal outputting process for detecting by a first acceleration sensor an acceleration caused substantially by a movement of a forearm during walking to output a first body motion signal and for detecting by a second acceleration sensor an acceleration caused substantially by a movement of the forearm during running to output a second body motion signal; and
performing a body motion component extracting process for extracting a body motion component from said first and second body motion signals, said body motion component being configured to be utilized to determine pitch to be used to calculate the number of a user's steps to be displayed to said user or to be stored.

13. The method as recited in claim 12, wherein
said body motion signal outputting process includes detecting the acceleration caused substantially by the movement of the forearm during walking the acceleration caused substantially by the movement of the forearm during running to output a second body motion signal, and
said body motion component extracting process includes
   performing a first frequency analyzing process for executing a frequency analysis of said first body motion signal,
   performing a second frequency analyzing process for executing a frequency analysis of said second body motion signal, and
   performing a reference wave determining process for determining a reference wave for extracting said body motion component based on results of the frequency analysis from said first and second frequency analysis processes.

14. The method as recited in claim 12, wherein
said body motion signal outputting process includes detecting the acceleration caused substantially by the movement of the forearm during walking to output a first body motion signal and detecting the acceleration caused substantially by the movement of the forearm during running to output a second body motion signal, and
said body motion component extracting process includes
   performing an amplifying process for creating an amplified first body motion signal by amplifying said first body motion signal by a prescribed amplification rate,
   performing a first frequency analyzing process for executing a frequency analysis of said amplified first body motion signal,
   performing a second frequency analyzing process for executing a frequency analysis of said second body motion signal, and
   performing a reference wave determining process for determining a reference wave for extracting a body motion component based on results of the frequency analysis from said first and second frequency analyzing processes.

15. A method of detecting a body motion of a human body, comprising:

performing a body motion signal outputting process for detecting an acceleration caused substantially by a movement of a forearm during walking and an acceleration caused substantially by a movement of the forearm during running to output at least one body motion signal; and performing a body motion component extracting process for extracting a body motion component from said at least one body motion signal, said body motion component being configured to be utilized to determine pitch to be used to calculate the number of a user's steps to be displayed to said user or to be stored, said body motion signal outputting process including detecting the acceleration caused substantially by the movement of the forearm during walking to output a first body motion signal and detecting the acceleration caused substantially by the movement of the forearm during running to output a second body motion signal, and said body motion component extracting process including performing an integrating process for creating an integrated body motion signal by integrating said first and second body motion signals, performing a frequency analyzing process for executing a frequency analysis of said integrated body motion signal, and performing a reference wave determining process for determining a reference wave for extracting said body motion component based on a result of the frequency analysis from said frequency analyzing process.

16. A method of detecting a body motion of a human body, comprising:

performing a body motion signal outputting process for detecting an acceleration caused substantially by the movement of the forearm during walking to output a first body motion signal and detecting the acceleration caused substantially by the movement of the forearm during running to output a second body motion signal; and performing a body motion component extracting process for extracting a body motion component from said first and second body motion signals including performing a preprocessing calculation process for outputting an integrated body motion signal by integrating said first and second body motion signals after preprocessing said first and second body motion signals such that maximum amplitudes of said first and second body motion signals become substantially equal to each other, performing a frequency analyzing process for executing a frequency analysis of said integrated body motion signal, and performing a reference wave determining process for determining a reference wave for extracting said body motion component based on a result of the frequency analysis from said frequency analyzing process, said body motion component being configured to be utilized to determine pitch to be used to calculate the number of a user's steps to be displayed to said user or to be stored.

17. A method for detecting a pitch of a body motion of a human body, comprising:

performing a body motion signal outputting process for detecting the acceleration caused substantially by a movement of a forearm of the human body during walking to output a first body motion signal and detecting the acceleration caused substantially by a movement of the forearm during running to output a second body motion signal;

performing a body motion component extracting process for extracting a body motion component from at least one of said first and second body motion signals by performing a first frequency analyzing process for executing a frequency analysis of said first body motion signal, a second frequency analyzing process for executing a frequency analysis of said second body motion signal, and a reference wave determining process for determining a reference wave for extracting said body motion component based on results of the frequency analysis from said first and second frequency analysis processes;

performing a signal extracting process for extracting signals having a prescribed ratio of power to a highest power signal based on said reference wave determined;

performing a pitch calculating process for calculating a pitch from a signal that is on furthest low frequency side among said signals extracted by said signal extracting process;

using said pitch to calculate the number of a user's steps; and displaying said number of steps to said user or storing said number of steps.

18. A method for detecting a step count of a body motion of a human body, comprising:

performing a body motion signal outputting process for detecting an acceleration caused substantially by a movement of a forearm of the human body during walking to output a first body motion signal and detecting an acceleration caused substantially by a movement of the forearm during running to output a second body motion signal;

performing a body motion component extracting process for extracting a body motion component from at least one of the first and second body motion signals by performing a first frequency analyzing process for executing a frequency analysis of said first body motion signal, a second frequency analyzing process for executing a frequency analysis of said second body motion signal, and a reference wave determining process for determining a reference wave for extracting said body motion component based on results of the frequency analysis from said first and second frequency analysis processes;

performing a signal extracting process for extracting signals having a prescribed ratio of power to a highest power signal based on said reference wave determined;

performing a pitch calculating process for calculating a pitch from a signal that is on furthest low frequency side among said signals extracted by said signal extracting process;

performing a step count calculating section for calculating the step counts from said pitch calculated; and outputting the step counts to a user or storing the step counts.

19. A method for detecting a pitch of a body motion of a human body, comprising:

providing a wristwatch type information processing device configured and arranged to be placed on a forearm of a human body to detect the body motion;

performing a body motion signal outputting process for detecting an acceleration caused substantially by a movement of the forearm during walking to output a first body motion signal and detecting an acceleration caused substantially by a movement of the forearm during running to output a second body motion signal;

performing a body motion component extracting process for extracting a body motion component from at least one of said first and second body motion signals by performing a first frequency analyzing process for executing a frequency analysis of said first body motion signal, a second frequency analyzing process for executing a frequency analysis of said second body motion signal, and a reference wave determining process for determining a reference wave for extracting said body motion component based on results of the frequency analysis from said first and second frequency analysis processes;

performing a signal extracting process for extracting signals having a prescribed ratio of power to the highest power signal based on said reference wave determined;

performing a pitch calculating process for calculating a pitch from a signal that is on furthest low frequency side among said signals extracted by said signal extracting process;

using said pitch to calculate the number of a user's steps; and displaying said number of steps to said user or storing said number of steps.

20. A control program stored in a computer-readable medium comprising instructions for performing:

controlling, by a computer, a body motion detection device attached to a human body to detect a body motion of the human body, said body motion detection device having a first acceleration sensor for detecting an acceleration caused substantially by a movement of a forearm of the human body during walking to output a first body motion signal and a second acceleration sensor for detecting an acceleration caused substantially by a movement of the forearm during running to output a second body motion signal;

executing a frequency analysis of said first body motion signal;

executing a frequency analysis of said second body motion signal;

determining a reference wave for extracting a body motion component based on results of the frequency analyses of said first and second body motion signals;

configuring said body motion component to be utilized to determine pitch to be used to calculate the number of a user's steps; and displaying said number of steps to said user or storing said number of steps.

21. A control program stored in a computer-readable medium comprising instructions for performing:

controlling, by a computer, a body motion detection device attached to a human body to detect a body motion of the human body, said body motion detection device having a first acceleration sensor for detecting an acceleration caused substantially by a movement of a forearm during walking to output a first body motion signal and a second acceleration sensor for detecting an acceleration caused by a movement of the forearm during running;

integrating said first and second body motion signals to produce an integrated body motion signal;

executing a frequency analysis of said integrated body motion signal;

determining a reference wave for extracting a body motion component based on a result of said frequency analysis;

configuring said body motion component to be utilized to determine pitch to be used to calculate the number of a user's steps; and displaying said number of steps to said user or storing said number of steps.

22. A control program stored in a computer-readable medium comprising instructions for performing:

controlling, by a computer, a body motion detection device attached to a human body to detect a body motion of the human body, said body motion detection device having a first acceleration sensor for detecting an acceleration caused substantially by a movement of a forearm of the human body during walking to output a first body motion signal and a second acceleration sensor for detecting an acceleration caused substantially by a movement of the forearm during running to output a second body motion signal;

creating an amplified first body motion signal by amplifying said first body motion signal by a prescribed amplification rate;

executing a frequency analysis of said amplified first body motion signal;

executing a frequency analysis of said second body motion signal;

determining a reference wave for extracting a body motion component based on results of said frequency analyses of said amplified first body motion signal and said second body motion signal;

configuring said body motion component to be utilized to determine pitch to be used to calculate the number of a user's steps; and displaying said number of steps to said user or storing said number of steps.

23. A control program stored in a computer-readable medium comprising instructions for performing:

controlling, by a computer, a body motion detection device attached to a human body to detect a body motion of the human body, said body motion detection device having a first acceleration sensor for detecting an acceleration caused substantially by a movement of a forearm of the human body during walking to output a first body motion signal and a second acceleration sensor for detecting an acceleration caused substantially by a movement of the forearm during running to output a second body motion signal;

outputting an integrated body motion signal by integrating said first and second body motion signals after preprocessing said first and second body motion signals such that maximum amplitudes of said first and second body motion signals become substantially equal to each other;

executing a frequency analysis of said integrated body motion signal; and determining a reference wave for extracting a body motion component based on a result of said frequency analysis from said frequency analyzing process;

configuring said body motion component to be utilized to determine pitch to be used to calculate the number of a user's steps; and displaying said number of steps to said user or storing said number of steps.

24. A control program stored in a computer-readable medium comprising instructions for performing:

controlling, by a computer, a device having a body motion detection device comprising a first acceleration sensor configured and arranged to detect said acceleration caused by the movement of the forearm during walking and output a first body motion signal, a second acceleration sensor configured and arranged to detect said acceleration caused by the movement of the forearm during running and output a second body motion signal, and a body motion component extracting section configured and arranged to extract a body motion component from said first and second body motion signals, said body motion component extracting section including a first frequency analysis section configured and arranged to execute an frequency analysis of said first body motion signal, a second frequency analysis section configured and arranged to execute an frequency analysis of said second body motion signal, and a reference wave determining section configured and arranged to determine a reference wave for extracting said body motion component based on results of the frequency analysis from said first and second frequency analysis sections, extracting signals having a prescribed ratio of power to a highest power signal based on said reference wave determined;

calculating a pitch from a signal that is on furthest low frequency side among said signals extracted by said extracting signals;

using said pitch to calculate the number of a user's steps; and displaying said number of steps to said user or storing said number of steps.

25. The control program as recited in claim 24, wherein said device having said body motion detection device is a pitch meter.

26. The control program as recited in claim 24, wherein said device having said body motion detection device is a wristwatch type information processing device.

27. A control program stored in a computer-readable medium comprising instructions for performing:

controlling, by a computer, a step counter having a body motion detection device comprising a first acceleration sensor configured and arranged to detect said acceleration caused by the movement of the forearm during walking and output a first body motion signal, a second acceleration sensor configured and arranged to detect said acceleration caused by the movement of the forearm during running and output a second body motion signal, and a body motion component extracting section configured and arranged to extract a body motion component from said first and second body motion signals, said body motion component extracting section including a first frequency analysis section configured and arranged to execute an frequency analysis of said first body motion signal, a second frequency analysis section configured and arranged to execute an frequency analysis of said second body motion signal, and a reference wave determining section configured and arranged to determine a reference wave for extracting said body motion component based on results of the frequency analysis from said first and second frequency analysis sections, extracting signals having a prescribed ratio of power to a highest power signal based on said reference wave determined;

calculating a pitch from a signal that is on furthest low frequency side among said signals extracted by said extracting signals;

calculating step counts from said pitch calculated;

outputting said step counts to a user or storing said step counts.

28. A computer readable recording medium having a control program comprising instructions for performing:

controlling, by a computer, a body motion detection device attached to a human body to detect a body motion of the human body, said body motion detection device having a first acceleration sensor for detecting an acceleration caused substantially by a movement of a forearm of the human body during walking to output a first body motion signal and a second acceleration sensor for detecting an acceleration caused substantially by a movement of the forearm during running to output a second body motion signal;

executing a frequency analysis of said first body motion signal;

executing a frequency analysis of said second body motion signal; and determining a reference wave for extracting a body motion component based on results of said frequency analyses of said first and second body motion signals;

configuring said body motion component to be utilized to determine pitch to be used to calculate the number of a user's steps; and displaying said number of steps to said user or storing said number of steps.

* * * * *